US012775529B2

(12) United States Patent
Sideris et al.

(10) Patent No.: US 12,775,529 B2
(45) Date of Patent: Oct. 27, 2026

(54) DATA PROCESSORS

(71) Applicant: Arm Limited, Cambridge (GB)

(72) Inventors: Isidoros Sideris, Cambridge (GB); Daren Croxford, Cambridge (GB); Edvard Sorgard, Trondheim (NO)

(73) Assignee: Arm Limited, Cambridge (GB)

( * ) Notice: Subject to any disclaimer, the term of this patent is extended or adjusted under 35 U.S.C. 154(b) by 621 days.

(21) Appl. No.: 18/323,793

(22) Filed: May 25, 2023

(65) Prior Publication Data

US 2023/0385106 A1 Nov. 30, 2023

(30) Foreign Application Priority Data

May 30, 2022 (EP) .................................... 22386033

(51) Int. Cl.

| | |
|---|---|
| ***G06F 9/48*** | (2006.01) |
| ***G06F 9/38*** | (2018.01) |
| ***G06F 11/00*** | (2006.01) |
| ***G06F 11/07*** | (2006.01) |
| ***G06F 11/1497*** | (2026.01) |
| ***G06F 11/16*** | (2006.01) |

(52) U.S. Cl.

CPC ........ *G06F 11/1629* (2013.01); *G06F 9/3877* (2013.01); *G06F 9/4881* (2013.01); *G06F 11/00* (2013.01); *G06F 11/008* (2013.01); *G06F 11/0706* (2013.01); *G06F 11/1497* (2013.01); *G06F 11/1633* (2013.01); *G06F 11/1645* (2013.01)

(58) Field of Classification Search

None

See application file for complete search history.

(56) References Cited

U.S. PATENT DOCUMENTS

| | | | | |
|---|---|---|---|---|
| 9,081,688 | B2 * | 7/2015 | Hinton ................ | G06F 12/0817 |
| 2009/0183035 | A1 | 7/2009 | Butler et al. | |
| 2017/0364332 | A1 | 12/2017 | Lowell | |
| 2018/0285230 | A1 | 10/2018 | Kaburlasos et al. | |
| 2021/0157600 | A1 | 5/2021 | Dejanovic et al. | |

OTHER PUBLICATIONS

Combined Search and Examination Report under Sections 17 and 18(3), dated Feb. 16, 2023, GB Patent Application No. GB2209632.5.

* cited by examiner

*Primary Examiner* — Qing Yuan Wu

(74) *Attorney, Agent, or Firm* — Pearl Cohen LLP

(57) ABSTRACT

A fault detection scheme for a data processor that comprises a programmable execution unit operable to execute programs to perform processing operations, and in which when executing a program, the execution unit executes the program for respective execution threads, each execution thread corresponding to a respective work item. In order to detect faults, a set of two or more identical execution threads is generated. The identical execution threads when executed perform identical processing for the same work item and a result of the processing of the same work item can thus be compared to determine whether there is a fault associated with the data processor.

20 Claims, 12 Drawing Sheets

DATA PROCESSORS

CROSS-REFERENCE TO RELATED APPLICATION

This application claims priority pursuant to 35 U.S.C. 119(a) to European Application No. 22386033.9, filed May 30, 2022, which application is incorporated herein by reference in its entirety.

BACKGROUND

The technology described herein relates generally to the operation of data processors such as graphics processors (graphics processing units, GPUs) that include a programmable execution unit that is operable to execute a set of instructions in a (shader) program to perform data processing operations, and wherein when executing a program, the programmable execution unit is operable to execute respective execution threads for executing the (shader) program instructions.

Many graphics processors now include one or more processing (shader) cores, that execute, e.g., programmable processing stages, commonly referred to as "shaders", of a graphics processing pipeline that the graphics processor implements. For example, a graphics processing pipeline may include one or more of, and typically all of: a geometry shader, a vertex shader and a fragment (pixel) shader. These shaders are programmable processing stages that execute shader programs on input data values to generate a desired set of output data, such as appropriately shaded and rendered fragment data in the case of a fragment shader, for processing by the rest of the graphics processing pipeline and/or for output.

A graphics processor shader core is thus a processing unit that performs processing by running (typically small) programs for each "work item" in an output to be generated. In the case of generating a graphics output, such as a render target, such as a frame to be displayed, a "work item" in this regard may be, e.g., a vertex (in the case of a vertex shader), but could also correspond, e.g., to a ray for use in a ray tracing operation, a sampling position that is being rendered, etc., depending on the nature of the shader program. In the case of compute shading operations, each "work item" in the output being generated will be, for example, the data instance (item) in the work "space" that the compute shading operation is being performed on.

In graphics processor shader operation each work "item" will normally be processed by means of an execution thread which will execute the instructions of the shader program in question for the work item in question.

In some cases, execution threads (where each thread normally corresponds to one work item) are grouped together into "groups" or "bundles" of threads, e.g. where the threads of one group are run in lockstep, e.g. one instruction at a time. In this way, it is possible to share instruction fetch and scheduling resources between all the threads in the group, and thus can improve shader program execution efficiency. (Other terms used for such thread groups includes "warps" and "wave fronts". For convenience, the term thread "group" will primarily be used herein, but this is intended to encompass all equivalent terms and arrangements.)

In graphics processing arrangements that include such processing (shader) cores, the graphics processor accordingly typically also comprises an execution thread generator (spawner) circuit that is operable to generate (spawn) threads (or groups thereof, in a system where execution threads can be grouped into thread groups) for execution by the programmable execution unit, as and when required. Thus, when executing a graphics processing pipeline including a programmable execution stage (shader), the corresponding execution thread generator (spawner) circuit for the shader will generate respective (groups of) execution threads for processing the work items that are required to be processed, which execution threads will then be executed by the execution unit accordingly to perform the processing for the work items for the graphics processing operation being performed.

It is becoming increasingly common for data processing units and data processing systems to be used to process data for use in environments such as automotive and medical environments where it is important, e.g. for safety reasons, that the processing output is correct.

For example, a graphics processor and graphics processing system may be used to render images for displaying to a driver of a vehicle, for example for a cockpit display, or as a mirror replacement system. In such situations, any errors in the images rendered by the graphics processor can have safety implications for the driver of the vehicle and/or for other people in or in proximity to the vehicle, and so it is important that the images rendered by the graphics processor are correct. Graphics processors and graphics processing systems may also be used in general purpose computations, such as machine learning (computer vision) for autonomous driving. Again, any errors in the compute operations can have serious safety implications, and so it is important that the computations are correct.

For safety-critical applications, such as data processing in automotive or medical environments, it is therefore important to be able to detect faults, including both 'hard' (e.g. process variation induced) and 'soft' errors. In such applications, the processing unit must accordingly be periodically tested for faults within a defined testing interval, e.g. to meet strict functional safety certification requirements. Runtime testing of the processing unit, e.g., by built-in self-test (BIST) or software library testing (SLT) can in many cases provide an efficient mechanism for testing the processing unit for faults (fault detection testing).

The Applicants have recognised however that there remains scope for improvements to the operation of such data processors, and in particular to improved fault detection (testing) techniques.

SUMMARY

A first embodiment of the technology described herein comprises a method of operating a data processor that comprises a programmable execution unit operable to execute programs to perform processing operations, and in which when executing a program, the execution unit executes the program for respective execution threads, each execution thread corresponding to a respective work item, the method comprising:

generating for execution by the execution unit a set of two or more identical execution threads, wherein each of the execution threads in the set of two or more identical execution threads is configured to perform identical processing for the same work item when executed;

executing by the execution unit the respective execution threads in the set of two or more identical execution threads such that the same work item is processed by each of the execution threads in the set of two or more identical execution threads;

comparing a result of the processing of the same work item for the respective execution threads in the set of two or more identical execution threads that have processed the work item; and using the comparison of the result of the processing of the same work item for the respective execution threads in the set of two or more identical execution threads that have processed the same work item to determine whether there is a (potential) fault associated with the data processor.

A second embodiment of the technology described herein comprises a data processor, the data processor comprising:

a programmable execution unit operable to execute programs to perform processing operations, and in which when executing a program, the execution unit executes the program for respective execution threads, each execution thread corresponding to a respective work item;

a thread generating circuit that is configured to generate for execution by the execution unit a set of two or more identical execution threads, each of the execution threads in the set of two or more identical execution threads being configured to perform identical processing for the same work item when executed; and a fault detection circuit that is configured to compare a result of the processing of a work item for respective execution threads in a set of two or more identical execution threads that have processed the same work item, and to use the comparison of the result of the processing of the work item for the respective execution threads in the set of two or more identical execution threads that have processed the same work item to determine whether there is a (potential) fault associated with the data processor.

The technology described herein relates to data processors such as graphics processors (graphics processing units, GPUs) that include one or more programmable execution unit(s) operable to execute (shader) programs to perform processing operations, and in which when executing a (shader) program, the execution unit executes the program for respective execution threads, each execution thread corresponding to a respective (shader) work item. Thus, when executing a (shader) program for part of a processing job, the data processor is configured to generate respective execution threads for execution by the execution unit(s) for processing the respective work items (e.g. vertices, sampling positions, rays, etc., depending on the (shader) program in question) that are required to be processed for the processing job (e.g. generating a render output).

In particular, the technology described herein is concerned with detecting (potential) faults associated with the operation of the programmable execution unit. This may include any faults affecting the execution unit itself and/or associated circuitry such as registers that may be used or accessible by the execution unit when executing a (shader) program. These faults may be transient ('soft' faults), e.g. due to a temporary fluctuation in the system such as an alpha particle strike, or may be more permanent ('hard') faults, e.g. resulting from process variation in the semiconductor circuitry (transistors) within the execution unit.

For example, it is particularly important to be able to reliably detect faults where the data processor is to be used for safety-critical applications, such as data processing in automotive or medical environments. Fault detection may also be important for power management. For instance, many process variation-based faults can be mitigated by operating at higher voltages. On the other hand, it is often desired to be able to operate at lower power and/or energy levels, particularly for data processors on mobile devices, where power and/or energy resource may be constrained. Thus, by being able to more reliably detect when faults are occurring, it may be possible to operate closer to the lower limit of the operating voltage range of the system.

The technology described herein accordingly provides an improved technique for detecting (potential) faults affecting a data processor, e.g., and in particular, faults affecting the operation of an execution unit of the data processor. The technology described herein may thus in turn provide an improved data processor operation, e.g. with better reliability and/or lower power requirements, as will be explained further below.

In the technology described herein, in order to detect potential faults affecting a data processor, e.g., and in particular, faults affecting the operation of an execution unit of the data processor, the processing of certain work items can be (and is) performed multiple times (e.g. in duplicate, or triplicate) by generating for execution by the execution unit a set of two or more identical execution threads. When the execution threads in the set of two or more identical execution threads are executed, the processing of the work item is thus identically performed by multiple identical execution threads, in a redundant manner.

The results of the different instances of processing the same work item by the identical execution threads can then be compared, e.g., and in an embodiment, 'on the fly' during the program execution. This comparison can in turn be used to determine whether there is a (potential) fault associated with the programmable execution unit.

For example, in an embodiment, the results of the processing of the same work item for respective execution threads in the set of identical execution threads are compared to determine whether (or not) the results of the processing of the work item are the same for each instance of processing the same work item by an execution thread in the set of two or more identical threads.

Because the threads in the set of two or more identical threads are generated to be (notionally) identical, the result of the processing of the same work item should be (i.e. and is expected to be) the same for each instance of redundantly processing the work item by an identical execution thread. However, if there is a fault associated with the programmable execution unit, this fault may result in the processing of the same work item giving a different result when executed by different ones of the identical execution threads.

Thus, for example, and in an embodiment, on the basis of this comparison showing that a processing result differs between different ones of the execution threads in the set of two or more identical threads, the technology described herein determines that there is a (potential) fault associated with the execution unit. Appropriate error detection and/or correction action can then be taken, e.g. as will be explained further below.

Thus, in embodiments, when the comparison shows the result of the processing of the work item that has been (redundantly) processed by the execution threads in the set of two or more identical execution threads is different for different ones of the execution threads in the set of two or more identical execution threads, the method comprises determining on that basis that there is a fault associated with the programmable execution unit.

Other arrangements would however be possible.

The comparison that is used for the fault detection (testing) according to the technology described herein is thus made at the execution thread level, by comparing the processing results for the same work item across identical threads.

This can in embodiments provide a relatively finer-grained approach to fault detection, that can at least indirectly test the operation of any functional units or associated circuitry of the programmable execution unit that may be used when executing a corresponding thread.

For example, in addition to testing the functional units of the execution unit itself, the technology described herein can also implicitly test, e.g., an associated set of registers for an execution unit, as the processing of the execution thread may typically involve accessing data within such registers. Other functional elements associated with the execution unit can be tested in a similar fashion.

The approach according to the technology described herein thus provides an effective approach for fault detection (testing) within an execution unit.

The approach according to the technology described herein in embodiments can also facilitate more dynamic error detection (and in some embodiments, error correction), e.g. that can be performed 'on the fly' during a processing job, e.g., and in an embodiment, without having to suspend the current processing job in order to perform fault detection testing.

That is, a benefit of the technology described herein is that at least in embodiments the fault detection (testing) can be performed within the execution unit as part of (and alongside) the normal processing operations that are being performed by the execution unit for a processing job, without necessarily having to suspend the processing job for the fault detection (testing).

Further, this can be achieved with a relatively low-complexity implementation, i.e. by appropriately replicating the thread generation for work items at certain points within the shader program to generate sets of identical threads, which identical threads can then be executed by the execution unit in the normal way to process the work item (but such that the processing of the work item is performed multiple times, using the identical threads). The processing results for each of the identical threads processing the same work item can then be (and are) compared, e.g. at the output of the execution unit, to determine whether (or not) there is a potential fault, e.g., and in an embodiment, based on whether or not the identical threads give the same (expected) processing result for the same work item.

For example, as mentioned above, more conventional runtime testing of the processing unit, e.g., by built-in self-test (BIST) or software library testing (SLT) can provide an efficient mechanism for testing the processing unit for faults (fault detection testing). However, such testing typically cannot be performed at the same time as the data processing, e.g. such that the processing unit must be taken "offline" to undergo fault detection testing. The actual processing may thus need to be periodically suspended in order to perform fault detection testing, e.g. which may need to be completed within a desired testing interval, which can therefore reduce the utilisation of the processor. This can also expend significant power, e.g., when writing out any job 'state' that is required to be written out during the suspend operation (e.g. in order to safely (subsequently) resume processing when the fault detection testing is complete).

The fault detection (testing) mechanism of the technology described herein may therefore provide various benefits compared to other fault detection (testing) approaches.

The redundant processing of a work item that is performed by a set of identical threads according to the technology described herein may be any suitable and desired processing.

As mentioned above, in embodiments, the work item (or items) that is redundantly processed by multiple identical execution threads is part of a 'normal' processing job (e.g. a graphics processing job) that is being performed by the execution unit. That is, the work items for which the processing is replicated across the set of identical threads are in an embodiment actual work items that need to be processed for a current processing job. For example, in the case of a graphics processor performing a graphics processing job, the work item may be, e.g., a vertex, a ray, a fragment (sampling position), etc., depending on the execution unit (shader core) in question. Or, when the graphics processor is being used to perform general purpose compute operations, the work item may be, e.g., a data instance (item) in the work "space" that the compute shading operation is being performed on.

The set of identical threads that are used in the technology described herein to perform the fault detection are thus in an embodiment generated in response to processing tasks issued to the execution circuit by the job controller, e.g. as part of the normal job control. The job controller can thus issue processing tasks, e.g., to a suitable shader endpoint for the execution unit, in the normal way.

The job controller is however in embodiments also operable to signal to the shader endpoint when the fault detection testing of the technology described herein is to be performed, and to thereby cause the shader endpoint to replicate the generation of threads for performing processing for at least some of the work items that are to be processed in order to perform the fault detection according to the technology described herein. In this way, the job controller can selectively enable the operation of the technology described herein such that identical threads can be scheduled (issued) for execution by the execution unit to perform the fault detection testing.

A benefit of this approach therefore is that, if no fault is detected, the processing can continue, using the result of the processing of the work item, without any need to interrupt the processing job. This can therefore provide an efficient way to dynamically test the operation of the execution unit, in use, using the existing thread generating processes, and in an embodiment with minimal additional hardware complexity (e.g. other than adding a suitable comparison circuit for comparing the processing results for the identical threads).

Thus, in embodiments, the fault detection is performed during a processing job, as part of the processing of (actual) work items for the processing job. In some embodiments, the generating of the identical threads is done periodically, at certain (regular or irregular) intervals throughout the processing job. That is, in some embodiments, the execution unit does not process each and every work item to be processed for the current processing job in a redundant manner (although it could do, if a higher level of safety was desired), but instead periodically or intermittently operates in the manner of the technology described herein, e.g. such that every $N^{th}$ work item (or $N^{th}$ set of work items is processed multiple times, in the redundant manner described above.

Thus, in embodiments, the thread generating circuit is caused to periodically or intermittently generate sets of identical threads for processing the same work item during the operation of the data processor. The fault detecting (testing) is thus in some embodiments performed (only) during certain testing intervals.

Thus, the execution of a (shader) program according to the technology described herein may effectively comprise a number of 'checkpoints' at which points the thread generating circuit is configured to replicate the thread generation for certain work items such that identical threads are generated for processing those work items, and executed such that multiple instances of processing the same work are performed using the identical threads, in order to perform the fault detection (testing) of the technology described herein. The position and frequency of these checkpoints can be suitably selected as desired, e.g. depending on the desired testing frequency (or, correspondingly, the desired level of reliability). Further, the position and frequency of these checkpoints can be varied, e.g. to increase the frequency of fault detection (testing), e.g. in response to detecting a change in the operating environment. For example, the operating environment of the device may be monitored and if the device changes temperature, the voltage changes, etc., fault detection (testing) may be triggered.

Thus, in embodiments, the method comprises monitoring an operating environment of the data processor and, in response to detecting a change in the operating environment, triggering fault detecting testing by generating for execution by the execution unit a set of two or more identical execution threads, wherein each of the execution threads in the set of two or more identical execution threads is configured to perform processing for the same work item when executed. The data processor may thus be associated with a suitable monitoring circuit that is configured to obtain data indicative of the operating environment of the data processor including, e.g., data indicative of the device operating conditions (voltages, temperatures etc.).

Other arrangements would however be possible for scheduling such fault detection (testing), as will be explained further below. For instance, in other examples, as mentioned above, each and every work item for a processing task may be redundantly processed, such that the entire processing task is performed in a redundant manner. This may be appropriate, e.g., when higher levels of functional safety are desired. For example, this may be particularly appropriate for safety critical automotive applications, in which case it may be better to always operate with the fault detection (testing) of the technology described herein, despite the power and/or energy cost. On the other hand, where the fault detection (testing) of the technology described herein is used for power management, in an embodiment the fault detection (testing) is performed periodically, as discussed above.

In an embodiment, each of the threads in a set of identical execution threads is therefore generated at (substantially) the same time, e.g. as part of a single thread group. Thus, in embodiments, the programmable execution unit is configured to execute groups of plural execution threads, and the set of identical threads may be a set of two or more execution threads within a single (the same) group of execution threads, e.g. generated within a single thread group generating cycle. Thus, when generating a group of execution threads, the thread generating circuitry is in an embodiment configured to generate within the group of execution threads a set (or subset) of two or more identical execution threads.

Correspondingly, the execution of the identical execution threads in a set of identical execution threads is in an embodiment therefore performed relatively closely together, e.g. during the same or adjacent processing cycles, in an embodiment as part of the processing of the same thread group, and therefore as part of the same overall processing job (e.g. as part of a single processing job, such that the comparison is made at the execution thread level within a processing job, e.g. rather than a comparison at the level of the final output, once the processing job is finished).

The times at which the identical execution threads are executed may also depend on the (physical) arrangement and configuration of the execution unit.

For example, in some embodiments, the execution unit may be configured to process (only) a single execution thread (performing processing for a respective work item) in one processing cycle, such that work items are processed in a serial manner. In that case, the identical execution threads are in an embodiment processed within adjacent, or nearly adjacent, processing cycles.

In embodiments, however, the execution unit is configured to be able to process groups of plural execution threads (performing processing for a respective plurality of work items) in parallel in a single processing cycle.

For instance, in an embodiment, as mentioned above, the programmable execution unit, when executing a program, executes the program for respective groups of plural execution threads, with each execution thread in a group of execution threads corresponding to a respective work item. Thus, the execution thread generating (spawning) circuit is in an embodiment configured to generate, in a single thread generating cycle, a group of execution threads. In an embodiment, the set of identical threads are generated and scheduled for execution as part of a single thread group, as mentioned above.

Thus, in embodiments, when executing a program, the programmable execution unit executes the program for groups of plural execution threads, and the set of two or more identical execution threads are generated as part of the same group of execution threads.

In embodiments where execution threads can be grouped into thread groups in this way, then the functional units for performing the processing operations in response to the instructions in a shader program are in an embodiment correspondingly operable so as to facilitate such thread group arrangements. In an embodiment, the functional units are each arranged with plural respective execution "lanes", so that a functional unit can execute the same instruction in parallel for plural threads of a thread group, e.g. in lockstep, e.g. in a single instruction, multiple thread manner, so that a respective thread is executed in each lane for executing the same instruction but using different input data.

In embodiments where there are plural execution lanes, there may be any suitable and desired correspondence between the number of execution lanes and the number of threads that are generated in a respective group of execution threads.

For instance, in an embodiment, there may be a one-to-one correspondence between the number of execution lanes and the number of threads that are generated in a respective group of execution threads.

Thus, for example, the functional units may be arranged as respective execution lanes, one for each thread that a thread group (warp) may contain (such that, for example, for a system in which execution threads are grouped into groups (warps) of eight threads, the functional units may be operable as eight respective (and identical) execution lanes), so that the programmable execution unit can execute the same instruction in parallel for each thread of a thread group (warp).

In that case, the (whole) group of execution threads can be (and in an embodiment is) executed in parallel across the corresponding plurality of execution lanes, e.g. in a single processing cycle. Where there is a one-to-one correspondence between the number of execution lanes and the number of threads that are generated in a respective group of execution threads, the programmable execution unit may be considered to have a 'wide warp' architecture, in that a given generated group of execution threads (or 'warp') can be processed in full in one processing cycle (i.e. the hardware size matches the size of the generated thread groups).

In such embodiments, where the execution lanes can process each (all) of the threads in a generated group of execution threads in parallel, across the corresponding plurality of execution lanes, the identical threads that are processing the same work item are thus in an embodiment processed in the same processing cycle, but in different execution lanes.

In other embodiments, however, there may be fewer execution lanes than there are threads in a group of execution threads generated in a single thread generating cycle. For example, in a system in which execution threads are grouped into groups (warps) of eight threads, the functional units may be operated as fewer than eight respective execution lanes, with the threads in a thread group (warp) thus being processed over multiple processing cycles (beats).

In that case, the programmable execution unit may be considered to have a 'deep warp' architecture, in that a given generated group of execution threads (or 'warp') must be processed in more than one processing cycle.

Again, in this case, so long as there are sufficient execution lanes to process two or more identical threads in a single processing cycle, the execution unit may be caused to process identical threads in the same processing cycle, but in different execution lanes.

Thus, in embodiments, the programmable execution unit comprises a plurality of processing lanes arranged in parallel, such that plural execution threads can be processed in different processing lanes of the execution unit in a single processing cycle, and the method comprises executing the identical threads in the set of identical threads in different processing lanes of execution unit in the same processing cycle. Thus, the comparison in such case in an embodiment includes a comparison of the processing result for identical execution threads executing in parallel different execution lanes in the same processing cycle.

However, in general, the identical threads may either be processed in the same processing cycle or in different processing cycles. For example, especially in embodiments where the number of threads in a generated thread group may exceed the number of execution lanes (such that a whole thread group must be processed over multiple processing cycles), it may be desired in some cases to execute identical threads over different processing cycles.

Thus, in embodiments, respective threads in the set of identical threads that perform processing of the same work item are executed by the execution unit in different processing cycles, such that the comparison includes a comparison of the processing result for identical execution threads performing processing of the same work item at different times. This may be because the threads need to be processed in different cycles, e.g. since there are not enough lanes to process all of the threads in a set of identical threads in one cycle, or may be because the thread generating (and/or scheduling) circuit is configured to cause respective threads in a set of identical threads to be executed in different cycles, even when it would be possible for them to be processed in one cycle.

When identical threads are processed in different processing cycles, the identical threads may be executed either in the same or in a different execution lane.

In this respect, the inventors recognise that executing identical threads in different lanes may provide improved fault detection, e.g. for detecting 'hard' faults, especially that affect less than all of the processing lanes. For instance, if the identical threads were all executed in the same faulty processing lane, it may not be possible to detect a 'hard' fault affecting only that execution lane (although this approach where the execution is staggered in time would still be effective, and potentially more effective, at detecting 'soft' or transient faults).

On the other hand, toggling between different processing lanes may involve an increased energy cost.

Various arrangements would be possible in this regard.

According to the technology described herein, as described above, a set of two or more identical threads are generated, and executed, in a redundant manner, such that processing for the same work item is performed a corresponding two or more times. A comparison of the processing results for the identical threads can then be (and is) made in order to determine whether there is a potential fault in the operation of the execution unit, e.g., and in an embodiment, on the basis that the otherwise identically generated threads are found to give a different processing result for the same work item.

The comparison can be made in any suitable and desired manner, e.g. depending on the work items in question.

For example, in an embodiment, the work items may correspond to individual work items within a respective set of work items. An example of this might be when the work items correspond to fragments within a set of (e.g. four) graphics fragments (sampling positions) (a 'quad'). In that case, a respective execution thread may be generated for each graphics fragment in the set of fragments. Furthermore, each of these execution threads may be replicated, such that a respective comparison is made for each graphics fragment in the set of fragments, e.g. on a fragment by fragment basis.

Thus, whilst embodiments are described above for ease of understanding in relation to comparing processing results for a single set of identical execution threads that perform processing for a corresponding single work item in a redundant manner, it will be appreciated that there may be multiple sets of identical execution threads within a single thread group, e.g., corresponding to multiple work items, with respective comparisons being made in respect of the threads within each set of identical execution threads, in the same manner described above.

Again, in this case, the different sets of identical execution threads can be executed across different execution lanes in a single processing cycle, or across different processing cycles either in a single execution lane or across different execution lanes. Various arrangements are possible in this regard.

Where a set of identical execution threads process a work item from a set of related work items (e.g. a fragment within a set of one or more fragments), the comparison is still made at the thread level, in respect of the work item in question.

However, in some cases, the results of the comparison may be aggregated for the set of related work items, e.g. such that even if one or more of the processing results did not show any fault, the processing results for the set of related work items as a whole are only used if each of the work items in the set of related work items completes without showing any faults. In other words, if any of the comparisons for any of the work items in a set of related work items determines that there is a fault, the whole set of related work items may be discarded, or re-run, etc., on the basis of the fault determination.

Therefore, in all cases according to the technology described herein, the comparison can be (and is) made at the level of the execution threads (i.e. individual work items), as explained above.

This can therefore provide improved granularity of the testing. For example, by appropriately distributing the execution of identical threads across different execution lanes, it may be possible to isolate faults to a particular execution lane (e.g. which execution lane can then be disabled, but leaving the other execution lanes available for processing, e.g. rather than disabling the entire execution unit).

In some embodiments, the same work item is processed in duplicate, e.g. using two (and only two) identical execution threads. In that case, when the processing result is the same for each of the identical execution threads, it is (in an embodiment) determined on that basis that there is no fault. However, when the processing result is different between the two identical execution threads, it is (in an embodiment) determined that there is a potential fault.

In this situation, where work items are processed in duplicate (and only in duplicate), if the two instances of processing the same work item give different processing results, there is then no way to determine which processing result is correct. Thus, in this case, the comparison circuit may simply flag that there is a potential fault. This can then be signalled to (e.g.) the driver for the data processor (together with the source of the fault, if that is known). The driver could then suspend the processing operation and abort the program. Or, the processing of the work item may be re-scheduled for a different execution unit, where one is available, such that the processing can continue. In that case, the faulty execution unit (or a faulty execution lane, if the error is localised to a lane) can be disabled by the driver.

In some embodiments however, the threads are in an embodiment re-issued to the same execution unit (at least once) in order to repeat the processing of the work item to see if the fault is a transient fault that has self-corrected.

Thus, in embodiments, in response to determining using the comparison that there is a fault associated with the programmable execution unit, the method comprises re-issuing the set of identical threads for processing the work item for execution by the programmable execution unit, and executing the threads again to perform the processing of the work item in question.

In that case, the job controller could simply cause the threads to be re-issued, and executed again, by the same execution unit, without changing the operation of the execution unit. In an embodiment, however, an operating parameter such as an operating voltage, operating frequency, or other suitable and desired operating parameter may be adjusted in response to detecting a potential fault.

For example, in response to detecting a potential fault, the operating voltage could be increased, to try to mitigate the fault. Thus, in embodiments, in response to determining using the comparison that there is a fault associated with the programmable execution unit, the method comprises adjusting an operating parameter of the data processor. In that case, the fault detecting (testing) is in an embodiment performed periodically or intermittently during the operation of the data processor, e.g. by periodically generating sets of identical execution threads. The operating parameter of the data processor may then be adjusted until, e.g., a specified (maximum) error rate has been reached.

This then allows more adaptive power management to in an embodiment keep the operating power close to the lower limit, whilst still ensuring a more reliable operation. For example, each time an output (e.g. a frame, or sequence of frames) is generated without any errors being detected, the operating voltage may be decreased. Eventually, when errors are detected, the operating voltage can be increased again. In this way, it is possible to adaptively control the operating voltage towards the lower (safe) operating limit.

Other suitable operating parameters such as the operating frequency could also be adjusted in a similar fashion, as desired. For example, there may be only a few voltage steps available (between the maximum and minimum operating voltages). However, the operating frequency may be adjustable over greater range. Thus, it may be desirable to also adjust the operating frequency, to better manage the reliability of the execution unit. For example, in a similar manner as described above for the operating voltage, the operating frequency may also be adaptively adjusted (e.g. increased), in use, e.g. each time an output is generated without any errors being detected.

In other words, in addition to providing improvements in reliability as such, the technology described herein may advantageously also allow the execution unit to be operated at lower operating voltages and/or higher operating frequencies, since the technology described herein provides an efficient and dynamic mechanism to detect when faults are occurring, and to re-issue threads and/or adjust the operating voltages accordingly, as and when needed, to ensure more reliable continued operation.

For example, due to process variation, each device may have slightly different characteristics. A specific device will be able to (safely) operate at a specific frequency for a given set of operating conditions (e.g. temperature) and voltage. The system may accordingly vary the voltage and/or operating frequency to determine the optimal voltage and/or operating frequency. The fault detection (testing) of the technology described herein may facilitate determining whether the execution unit (or another element of the data processor) is operating at its limit, and allow the voltage and/or frequency to be adjusted until the error rate is acceptable. This can provide an efficient and dynamic approach for keeping the data processor operating close to it maximum efficiency level for the current operating conditions.

Running at least some work items in duplicate to detect faults can therefore in fact provide an overall saving in power/energy. For instance, even though running some work items twice will require double the processing power, if that means that the operating voltage can be reduced by half, or even further than that, then there is an overall power/energy saving (since power scales as voltage squared). Further, when the fault detection (testing) is performed periodically, reducing the operating voltage means that during the other periods (when fault detection (testing) is not being performed), there is further power/energy saving.

As mentioned above, running threads for work items in duplicate does not however allow the system to determine which processing result is correct (where the threads give different processing results). Thus, the work item may need to be processed again, or the processing job may need to be discarded, e.g. until a reliable result is obtained.

In other embodiments, the same work item may therefore be (and is) processed more than twice, e.g. in triplicate (by executing a corresponding set of three identical threads).

In that case, in addition to being able to detect a potential fault, where the processing results differ between the identical threads, the fault detection circuit may, and in an embodiment is, also able to perform fault 'correction', e.g. by selecting the majority result from the three or more identical threads, and then continue the processing accordingly using the majority result. For example, if a majority of the execution threads give the same processing result, this result can then be, and in an embodiment is, taken as the 'correct' result, and used accordingly (since it is relatively unlikely that the majority of the threads will have the same error).

Thus, in embodiments, the set of identical threads comprises three or more identical execution threads for processing the same work item, and in response to different instances of processing the same work item using respective threads in the set of identical threads giving different processing results, a majority processing result from the set of identical threads processing the work item is used for continuing processing.

Where three (or more) identical threads are generated, the technology described herein can therefore still detect the occurrence of a potential fault, but can in an embodiment also determine the correct processing result, and continue processing. In an embodiment, in such cases, the fault occurrence is still flagged, e.g. for diagnostic purposes. In embodiments, the data processor can also take action, e.g. to increase the operating voltage as discussed above (but it need not do, e.g. as a benefit of running in triplicate (or more) is that the data processor can tolerate reduced voltage operation and still correct faults).

(Of course, if the three or more identical threads still do not provide an unambiguous majority processing result, e.g. since they all give different processing results, in that case it is also not possible to determine the correct processing result, in which case the fault may simply be reported, and appropriate action taken, as described above in relation to the case where there are only two identical threads.)

As mentioned above, the identical execution threads in an embodiment correspond to actual work items, such that the fault detection is performed 'on the fly' as part of an actual processing job. Thus, embodiments are described above where the processing of actual work items (e.g. vertices, fragments/sampling positions, etc.) that are being processed for a processing job is replicated for the purposes of fault detection, such that the fault detection (testing) is advantageously built into the normal processing work that is being performed by the data processor.

That is, in embodiments, the data processor is executing a program to perform an overall processing job (e.g. a graphics processing job, e.g. to generate a render output), and wherein the work items correspond to work items that need to be processed for the processing job. The step of generating for execution by the execution unit a set of two or more identical execution threads for processing the same work item in that case in an embodiment comprises replicating the thread generation for a work item that needs to be processed for the overall processing job.

However, it will be appreciated that the technology described herein may also be used to perform dedicated fault detection testing work, e.g. as part of an "offline" safety testing operation. In that case, the work items that are processed redundantly using the identical threads may be work items that are configured to perform certain types of fault detection testing, as desired. That is, the program that is executed may be a program that is designed to fault test the execution unit, with the work items thus corresponding to 'test vectors' that are designed to test a particular functional unit or operation of the execution unit.

For example, because the fault detection testing is performed at execution thread level, the testing can implicitly detect errors in any functional units and/or associated circuitry of the execution unit that may be used when executing a given thread. For example, even when the testing is performed during normal operation, as described above, the registers (for example) will be indirectly tested as and when they are used during the processing of a given work item. However, when the work items are specifically designed for fault detection testing, this means that the work items (test vectors) can then be designed to test any suitable functional unit and/or circuitry (the registers, etc.), as desired.

Thus, in embodiments, the work items that are processed using the set of identical threads to determine whether there is a fault associated with the programmable execution unit are dedicated work items designed to test one or more functional units associated with the programmable execution unit for faults. In that case, the dedicated work items for the fault detection can be, and in an embodiment are, executed after a processing job has finished and used to determine whether the processing job has completed without any faults.

This can provide an easier way to perform testing of the programmable execution unit as the execution threads executing the work item can be designed to perform a set of one or more processing operations to test components of the programmable execution unit, as desired, e.g. in order to isolate or identify faults. For example, one can perform a dedicated testing operation that performs a sequence of one or more operations to test the registers.

Further, this can be done with high granularity, i.e. at the execution thread level, which as explained above can provide a powerful approach for fault detection and isolation of the fault, e.g., to a particular processing lane or functional unit of the execution unit that is being tested.

The fault detection may then be performed in the same manner described above, by replicating the processing of the work item a plurality of times, and comparing the result accordingly. However, the work item does not relate to actual processing work, but is instead a suitable test vector arranged to perform fault detection testing.

This testing work can be scheduled in the same manner described above, by generating suitable identical execution threads for execution by the execution unit, and then executing these in the normal way. This means that even when the testing relates to a dedicated testing operation, it can still more easily be interleaved with actual processing work, e.g. by processing suitable 'test' work items at the end of a processing job (e.g. the end of a frame), without having to perform a hard suspend/resume operation, e.g. as may be the case in other (e.g. BIST) arrangements.

Various other arrangements would be possible in this regard.

The fault detection according to the technology described herein may thus provide various benefits in terms of achieving higher functional safety and/or improved power management.

It will be appreciated that where higher levels of functional safety are required the fault detection according to the technology described herein may also be used in combination with other fault detection techniques (such as BIST and/or SLT) but in that case the technology described herein may advantageously reduce the frequency at which such testing is performed.

Similarly, whilst the fault detection testing of the technology described herein is generally able to detect faults that affect the operation of the execution unit and any of its associated circuitry, and the technology described herein provides an improved mechanism for doing this, there may be other functional units of the data (e.g. graphics) processor that cannot be tested in this way. However, other suitable fault detection or correction techniques, such as conventional error correcting codes, parity checks, etc., can be used for detecting (and in an embodiment correcting) faults within other such functional units that cannot be tested in this way, at least where higher levels of functional safety are desired (or required).

The data processor can be any suitable and desired data processor that includes a programmable execution unit that can execute program instructions. In an embodiment the data processor is a graphics processor but the data processor could be other suitable thread-based processors.

As mentioned above the technology described herein is particularly suitable for data processors that are performing safety critical processing work, such as for automotive and/or medical applications. Thus, in some embodiments, the data processor is a data processor that is configured to perform such safety critical processing work. However, as also mentioned above, the technology described herein may also find more general utility, e.g. in optimising the performance power/energy consumption of the data processor.

The programmable execution unit of the data (graphics) processor that is to be tested according to the technology described herein can be any suitable and desired programmable execution unit that is operable to execute, e.g. shader, programs.

The data (graphics) processor may comprise a single programmable execution unit, or may have plural execution units. Where there are plural execution units, each execution unit can, and in an embodiment does, operate in the manner of the technology described herein.

Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units), etc.

As mentioned above, in an embodiment, the data (graphics) processor and the programmable execution unit is operable to execute shader programs for groups ("warps") of plural execution threads together, e.g., and in an embodiment, in a single instruction, multiple thread (SIMT) state, where execution threads execute program in lockstep, e.g. one instruction at a time. However, other arrangements for executing groups of plural execution threads would be possible.

In the case where execution threads can be grouped into thread groups (warps) in the manner discussed above, the functional units, etc., of the programmable execution unit are in an embodiment configured and operable so as to facilitate such thread group arrangements. Thus, for example, the functional units are arranged as respective execution lanes, e.g. as described above. Various different physical arrangements for the execution lanes are possible.

The data (graphics) processor in an embodiment also comprises any other appropriate and desired units and circuits required for the operation of the programmable execution unit(s), such as appropriate control circuits (control logic) for controlling the execution unit(s) to cause and to perform the desired and appropriate processing operations.

Thus, as mentioned above, the data (e.g. graphics) processor in an embodiment comprises an execution thread generator (spawner) circuit that generates (spawns) (groups of) threads for execution. In an embodiment, the data (e.g. graphics) processor also comprises an execution thread scheduler circuit, which is operable to issue thread groups to the programmable execution unit for execution and to control the scheduling of thread groups on/to the programmable execution unit for execution (this may be part of the thread generator circuit).

In an embodiment, the data (e.g. graphics) processor further comprises one or more of, and in an embodiment all of: an instruction decode circuit or circuits operable to decode instructions to be executed; an instruction issue circuit or circuits operable to issue instructions to be executed to the programmable execution unit so as to cause the execution unit to execute the required instructions for a thread group; an instruction fetch circuit or circuits operable to fetch instructions to be executed (prior to the decode circuit(s)); and an instruction cache for storing instructions locally to the programmable execution unit for execution by execution threads being executed by the programmable execution unit.

As well as the programmable execution unit, the data (e.g. graphics) processor in an embodiment includes a group of plural registers (a register file) operable to and to be used to store data for execution threads that are executing. Each thread of a group of one or more execution threads that are executing a, e.g. shader, program in an embodiment has an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

As mentioned above, the fault detection testing of the technology described herein can advantageously also test such registers, since a fault in the registers will typically affect the processing of a corresponding work item using the registers.

Where there are plural execution units, each execution unit may have its own distinct group of registers (register file), or there may be a single group of registers (register file) shared between plural (e.g. some or all) of the separate execution units. The group(s) of registers (register file(s)) can take any suitable and desired form and be arranged in any suitable and desired manner, e.g., as comprising single or plural banks, etc.

The data (graphics) processor in an embodiment correspondingly comprises appropriate load/store units and communication paths for transferring data between the registers/register file and a memory system of or accessible to the data (graphics) processor (e.g., and in an embodiment, via an appropriate cache hierarchy).

Thus, the data (graphics) processor in an embodiment has an appropriate interface to, and communication with memory (a memory system) of or accessible to the data (e.g. graphics) processor.

The memory and memory system is in an embodiment a main memory of or available to the data (graphics) processor, such as a memory that is dedicated to the data (graphics) processor, or a main memory of a data processing system that the data (graphics) processor is part of. In an embodiment, the memory system includes an appropriate cache hierarchy intermediate the main memory of the memory system and the programmable execution unit(s) of the data (graphics) processor.

The technology described herein has been described above with reference to the operation of the data processor in general. In the case where the data (e.g. graphics) processor includes multiple processing cores, then each processing core can, and in an embodiment does, operate in the manner of the technology described herein (i.e. such that each processing core has its own respective execution processing circuit, thread issuing circuit, etc., all of which are operable in the manner of the technology described herein).

In some embodiments, the data (graphics) processor comprises, and/or is in communication with, one or more memories and/or memory devices that store the data described herein, and/or store software for performing the processes described herein. The data (graphics) processor may also be in communication with a host microprocessor, and/or with a display for displaying images based on the data generated by the data (graphics) processor.

In an embodiment, the data (graphics) processor is part of an overall data processing system that comprises one or more memories and/or memory devices and a host processor (and, in an embodiment, a display). In an embodiment, the host microprocessor is operable to execute applications that require data processing by the data (e.g. graphics) processor, with the data (e.g. graphics) processor operating in the manner of the technology described herein when required to process data by applications executing on the host processor.

Other arrangements would, of course, be possible.

The data (e.g. graphics) processor of the technology described herein can be used for all forms of output that a data (e.g. graphics) processor (and processing pipeline) may be used to generate.

For example, in the case of a graphics processor, the graphics processor may generate frames for display, render-to-texture outputs, etc. The output data values from the processing are in an embodiment exported to external, e.g. main, memory, for storage and use, such as to a frame buffer for a display. In the case of a graphics processor, the graphics processor may be used for any suitable rendering scheme, including rasterisation-based rendering, but also including ray tracing or hybrid ray tracing operations.

Moreover, a graphics processor need not perform graphics processing operations but may also be configured to perform general purpose graphics processing operations.

For instance, it is also known to use graphics processors and graphics processing pipelines, and in particular the shader operation of a graphics processor and graphics processing pipeline, to perform more general computing tasks, e.g. in the case where a similar operation needs to be performed in respect of a large volume of plural different input data values. These operations are commonly referred to as “compute shading” operations and a number of specific compute APIs, such as OpenCL and Vulkan, have been developed for use when it is desired to use a graphics processor and a graphics processing pipeline to perform more general computing operations.

Compute shading is used for computing arbitrary information. It can be used to process graphics-related data, if desired, but is generally used for tasks not directly related to performing graphics processing. For example, compute shading may be used to perform calculations for confirming transactions within a distributed ledger (e.g. a blockchain). Other examples would of course be possible.

The technology described herein can also be applied to such compute shading operations.

The technology described herein is thus applicable to any suitable form or configuration of data (e.g. graphics) processor and data processing system.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor-based system. In an embodiment, the technology described herein is implemented in a computer and/or microprocessor-based system.

The various functions of the technology described herein can be carried out in any desired and suitable manner. For example, the functions of the technology described herein can be implemented in hardware or software, as desired. Thus, for example, unless otherwise indicated, the various functional elements, and stages, of the technology described herein may comprise a suitable processor or processors, controller or controllers, functional units, circuitry/circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

BRIEF DESCRIPTION OF THE DRAWINGS

A number of embodiments of the technology described herein will now be described by way of example, and with reference to the following figures, in which.

Figure 1:
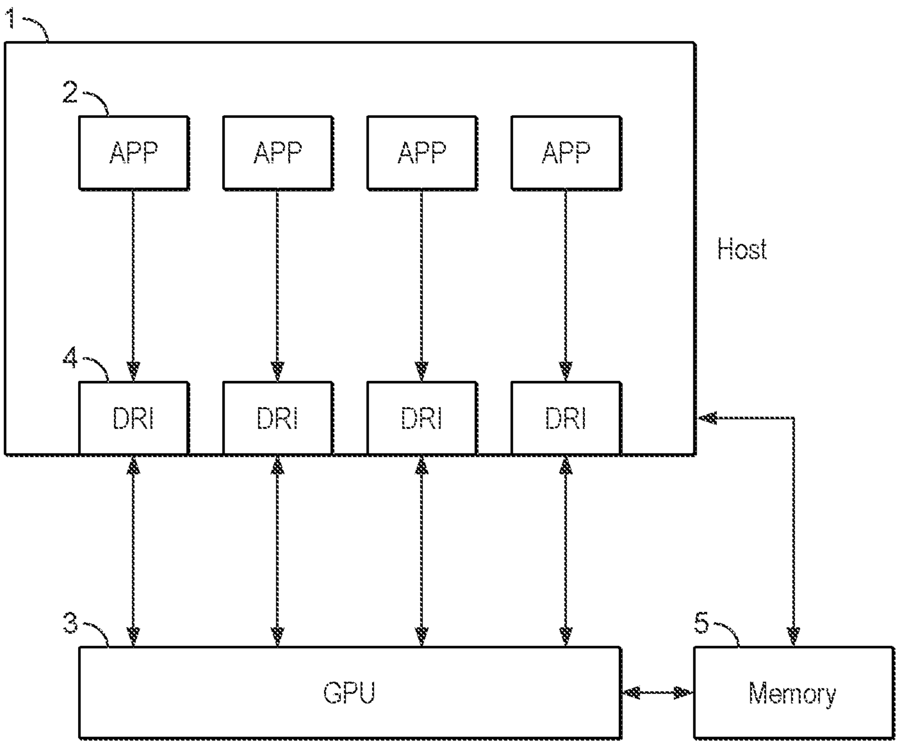
FIG. 1 shows schematically a graphics processing system within which the technology described herein can be performed.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings. Like reference signs are used in the figures to denote like elements or units.

DETAILED DESCRIPTION

A number of embodiments of the technology described herein will now be described in the context of the processing of computer graphics for display by a graphics processor. However, it will be appreciated that the techniques for handling groups of execution threads described herein can be used in other non-graphics contexts in which (groups of) threads are used.

FIG. 1 shows an exemplary computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into respective sets of one or more graphics fragments (fragment work items) for graphics rendering in turn. During a normal graphics rendering operation, the renderer will modify the (e.g.) colour (red, green and blue, RGB) and transparency (alpha, a) data associated with each set of fragments so that the fragments can be displayed correctly. Once the fragment work items have fully traversed the renderer, their associated data values are then stored in memory, ready for output, e.g. for display.

In the present embodiments, graphics processing is carried out in a pipelined fashion, with one or more pipeline stages operating on the data to generate the final render output, e.g. frame that is displayed.

Figure 2:
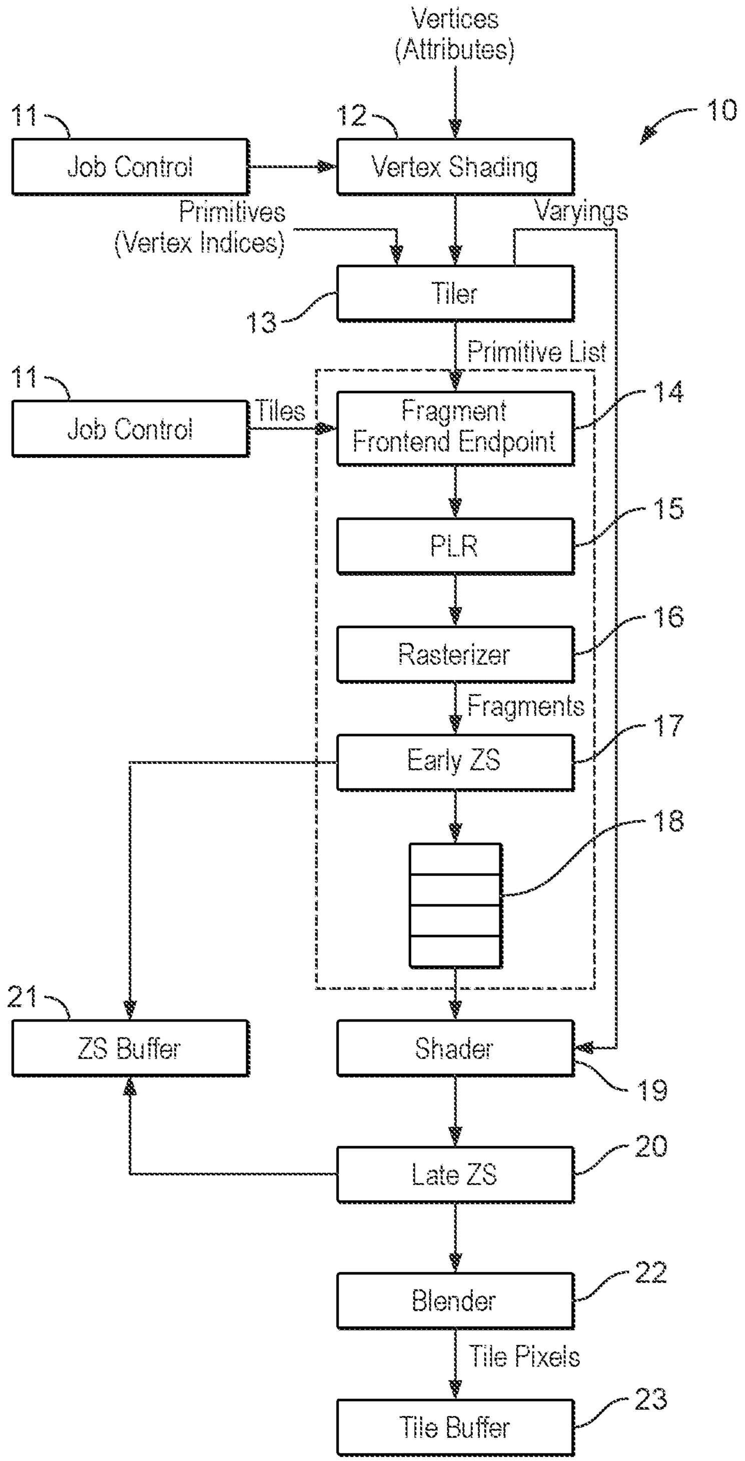
FIG. 2 shows schematically an example of a graphics processing pipeline within which the technology described herein can be performed.

FIG. 2 shows an exemplary graphics processing pipeline 10 that may be executed by a graphics processor. The graphics processing pipeline 10 shown in FIG. 2 is a tile-based system, and will thus produce tiles of a render output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 2 shows the main elements and pipeline stages of a graphics processing pipeline that may be operated according to embodiments of the technology described herein. As will be appreciated by those skilled in the art, there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by an appropriate graphics processing unit (GPU) (graphics processor) that includes the necessary functional units, processing circuits, etc., operable to execute the graphics processing pipeline stages.

In order to control a graphics processor (graphics processing unit) that is implementing a graphics processing pipeline to perform the desired graphics processing operations, the graphics processor will typically receive commands and data from a driver, e.g. executing on a host processor, that indicates to the graphics processor the operations that it is to carry out and the data to be used for those operations.

As shown in FIG. 2, for an output to be generated, a set of vertices (with each vertex having one or more attributes, such as positions, colours, etc., associated with it) is provided to a vertex shading unit 12. A job controller 11 then causes the vertex shading unit 12 to process the input vertices, e.g. to transform the positions for the vertices from the, e.g. "world" space in which they are initially defined, to the, e.g. "screen", space that the output image is being generated in.

The graphics processor includes a tiler 13 for preparing primitive lists. The tiler in effect determines which primitives need to be processed for different regions of the render output. In the present embodiments, these regions may, e.g., represent a tile into which the overall render output has been divided into for processing purposes, or a set of multiple such tiles.

To do this, the tiler 13 receives the shaded vertices, as well as a set of indices referencing the vertices in the set of vertices, and primitive configuration information indicating how the vertex indices are to be assembled into primitives for processing when generating the output, and then compares the location of each primitive to be processed with the positions of the regions, and adds the primitive to a respective primitive list for each region that it determines the primitive could (potentially) fall within. Any suitable and desired technique for sorting and binning primitives into primitive lists, such as exact binning, or bounding box binning or anything in between, can be used for the tiling process.

The tiler 13 thus performs the process of "tiling" to allocate the assembled primitives to primitive lists for respective render output regions (areas) which are then used to identify the primitives that should be rendered for each tile that is to be rendered to generate the output data (which may, e.g. be a frame to be rendered for display). For example, the tiler 13 may be implemented using a primitive list building unit which takes the assembled primitives as its input, builds primitive lists using that data, and stores the primitive lists in memory.

Once the tiler 13 has completed the preparation of the primitive lists (lists of primitives to be processed for each region), then each tile can be rendered with reference to its associated primitive list(s).

To do this, each tile is processed by the graphics processing pipeline stages shown in FIG. 2.

The job controller 11 issues tiles to a "fragment" frontend endpoint 14 that receives the tile to be processed and the primitive lists, which are then passed to a primitive list reader 15 (PLR) that determines which primitives need to be rendered for the tile in question.

A rasterisation stage (circuit) (rasteriser) 16 then takes as its input the primitives (including their vertices), from the primitive list(s) for the tile being rendered, rasterises the primitive to fragment work items, and provides the fragment work items to a fragment processing stage (circuit) 19, which in this embodiment comprises a shader execution engine (a shader core). The shader execution engine is a programmable execution unit that performs fragment shading by executing fragment shading software routines (programs) for fragments received from the rasteriser 16.

In this example the fragment work items generated by the rasteriser 16 are subject to (early) depth (Z)/stencil testing 17, to see if any fragment work items can be discarded (culled) at this stage. To do this, the Z/stencil testing stage 17 compares the depth values of (associated with) fragment work items issuing from the rasteriser 16 with the depth values of fragment work items that have already been rendered (these depth values are stored in a depth (Z)/stencil buffer 21) to determine whether the new fragment work items will be occluded by fragment work items that have already been rendered (or not). At the same time, an early stencil test is carried out.

Fragment work items that pass the fragment early Z and stencil test stage 17 may then be used for various further culling operations, as desired, before the remaining fragment work items are then passed to a fragment shading stage for rendering.

The fragment work items that survive the primitive processing are then queued 18 for input to the fragment processing stage (circuit) 19 (the fragment shader).

Each fragment work item will be processed by means of one or more execution threads which will execute the instructions of the shader program in question for the fragment work item in question. Typically, there will be multiple execution threads each executing at the same time (in parallel).

Other vertex attributes (varyings), such as colours, transparency, etc., that are needed will be fetched (and as necessary "vertex shaded") as part of the fragment shading processing.

After the fragment shading is performed, a late depth/stencil text 20 may then be performed.

After this, the output of the fragment processing (the rendered fragment work items) is then subject to any desired post-processing, such as blending (in blender 22), and then written out to a tile buffer 23. Once the processing for the tile in question has been completed, then the tile will be written to an output data array in memory, and the next tile processed, and so on, until the complete output data array has been generated. The process will then move on to the next output data array (e.g. frame), and so on.

The output data array may typically be an image for a frame intended for display on a display device, such as a screen or printer, but may also, for example, comprise intermediate render data intended for use in later rendering passes (also known as a "render to texture" output), etc.

Other arrangements would of course be possible.

The technology described herein particularly relates to the detection of potential faults within programmable execution stages (shaders) such as the vertex shading unit 12 and/or the fragment processing stage (fragment shader) 19 in the graphics processing pipeline 10 shown in FIG. 2.

Figure 3:
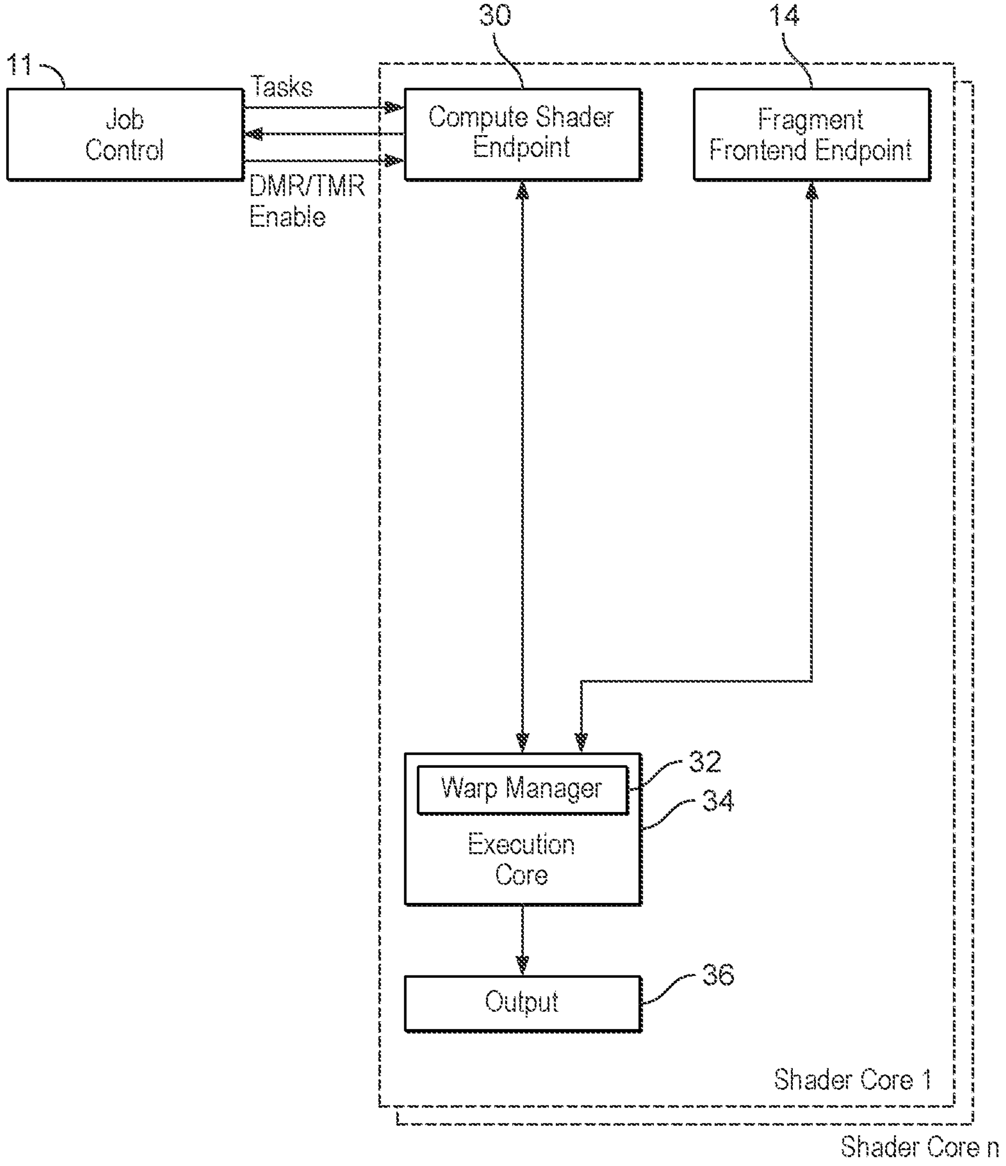
FIG. 3 shows schematically the relevant functional units of a graphics processor shader core an embodiment.

FIG. 3 shows schematically some of the relevant functional units for an execution unit (shader core) of a graphics processor an embodiment.

As discussed above, there is an overall job controller 11 that is operable to schedule processing tasks to be performed by the execution unit (shader core). In the example shown in FIG. 3, the execution unit comprises a plurality of shader cores (shader core 1, shader core n) that are arranged in parallel and the job controller 11 is operable to schedule processing tasks for each of the shader cores.

Other arrangements would of course be possible.

In particular, FIG. 3 shows an example of a fragment shader (e.g. fragment processing stage 19 in the graphics processing pipeline 10 in FIG. 2) and the job controller 11 is therefore operable to schedule fragment processing tasks for a respective shader core, which processing tasks are then handled by a respective fragment frontend endpoint 14 for the shader core.

(As shown in FIG. 3, the unit also comprises a compute shader endpoint 30 that is operable to handle compute shader tasks. These are handled in a similar manner as described above, by the job controller 11 issuing tasks to the compute shader endpoint 30 for processing work items, but wherein the work items do not correspond to fragments, but instead correspond to data instances (items) in the work "space" that the compute shading operation is being performed on.)

The job controller 11 thus issues processing tasks to the relevant shader endpoint which then causes the warp manager 32 to generate an appropriate group of execution threads for processing the work items that are required to be processed for the processing task in question.

The generated group of execution threads are scheduled for execution by the execution core 34 accordingly, and then executed, in order to perform the desired processing for the work items. The result of the processing for the work item is in turn provided to a suitable output stage 36 of the shader core (e.g. such that it may be used by subsequent stages of the graphics processing pipeline 10 for continuing the overall graphics processing (e.g. rendering) operation that is being performed).

The functional elements of the execution core 34 can be laid out in various different physical arrangements. For example, a simple execution core 34 is shown in FIG. 4.

Figure 4:
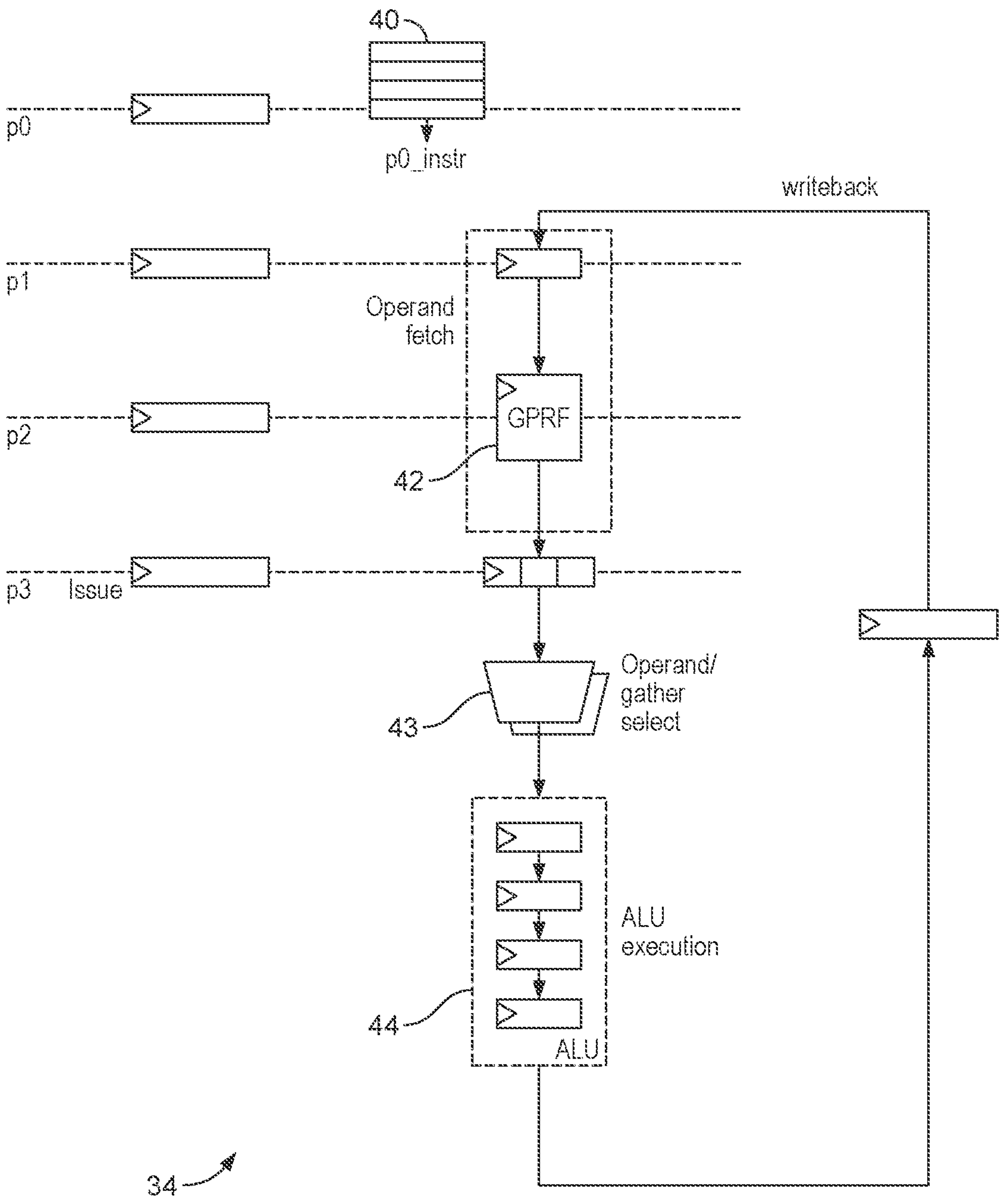
FIG. 4 shows schematically an example data path within a graphics processor shader core, in which work items are processed in a serial manner.

FIG. 4 shows a plurality of pipeline stages p0, p1, p2 and p3. The first pipeline stage p0 is configured to receive and decode respective instructions 40 for the processing that is to be performed by the execution core. For example, these instructions 40 may be fetched from suitable instruction storage (an instruction cache) and then processed accordingly to control the processing that is to be performed by the execution core 34. The instructions 40 may thus cause respective work items to be scheduled for processing by the execution core 34.

The next pipeline stage p1 then fetches the required operands for the processing of the work items which are then loaded into a set of general purpose register files 42 allocated to the execution core at pipeline stage p2. Pipeline stage p3 then issues work items for execution by the execution lane 44 of the execution core, at which point the required operands are gathered and selected 43.

The work items are then processed by the execution lane 44 of the execution core in turn, with the processing results (output) being written back into the general purpose registers 42 as shown in FIG. 4.

As mentioned above, in FIG. 4, the execution core 34 includes a single execution lane 44. Thus, in the execution core 34 shown in FIG. 4, work items are processed in a serialised manner, with only a single work item being processed in each processing cycle. The technology described herein may be applied in such cases.

To improve shader efficiency, however, the execution core in the following embodiments is arranged as a plurality of identical and parallel execution lanes such that a corresponding plurality of work items can be processed in a single processing cycle.

For example, in the present embodiments, the shader core unit is configured to process groups of plural threads (e.g. 'warps'). The functional units are therefore correspondingly arranged to facilitate this by arranging them as respective execution lanes, with each execution lane operable to process a corresponding work item (by executing a respective thread for the work item).

Figure 5:
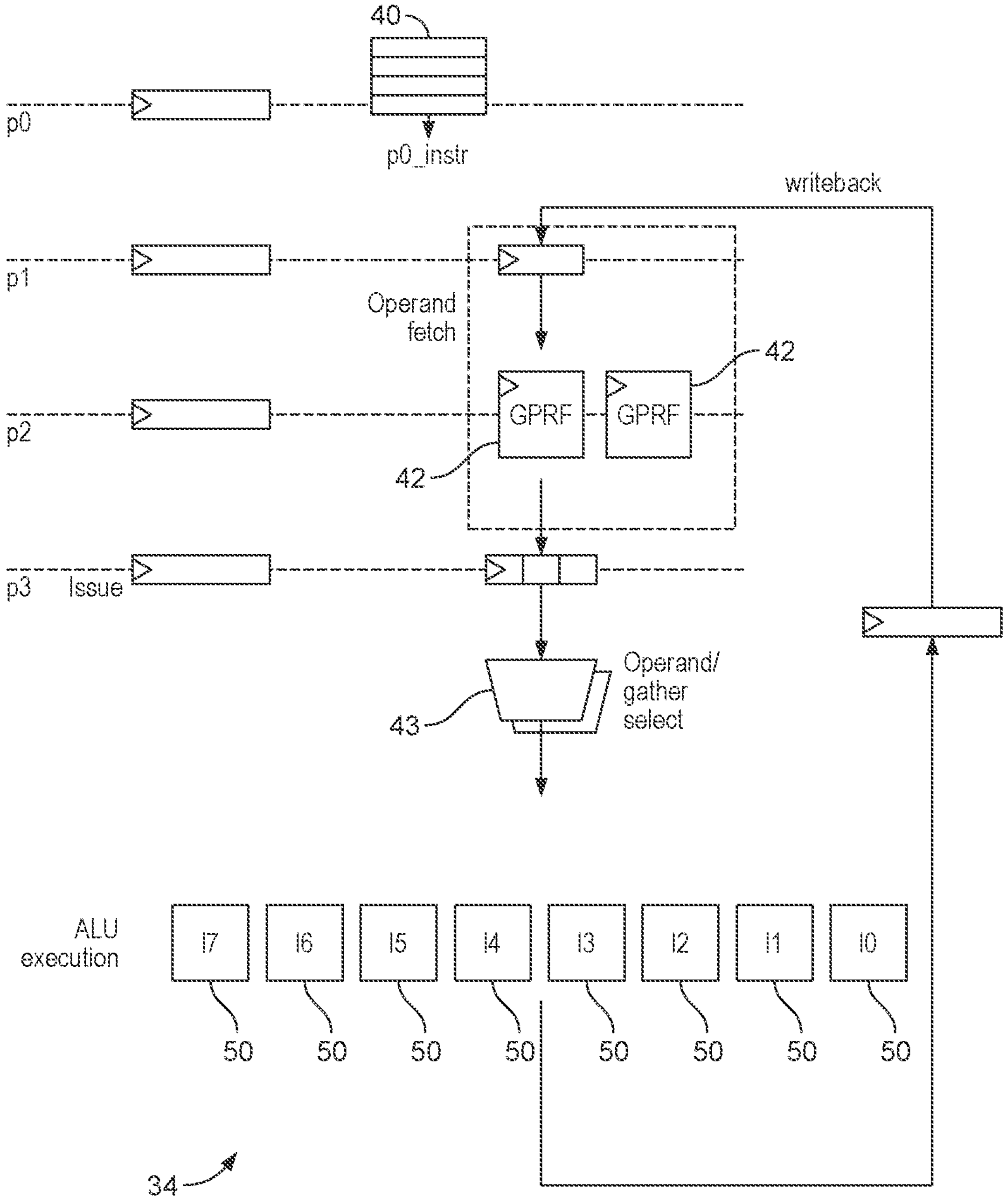
FIG. 5 shows schematically another example data path within a graphics processor shader core, in which example the shader core is arranged as a plurality of parallel execution lanes in a 'wide warp' architecture.

FIG. 5 shows schematically an example of a so-called 'wide warp' architecture in which the execution core 34 is arranged as a respective eight parallel and identical execution lanes 50. For instance, for a system in which execution threads are grouped into groups (warps) of eight threads, the execution core 34 is then able to execute the same instruction in parallel for each thread of a thread group (warp) in the same processing cycle. Thus, in that example, the size of a generated thread group is the same as the hardware size.

Figure 6:
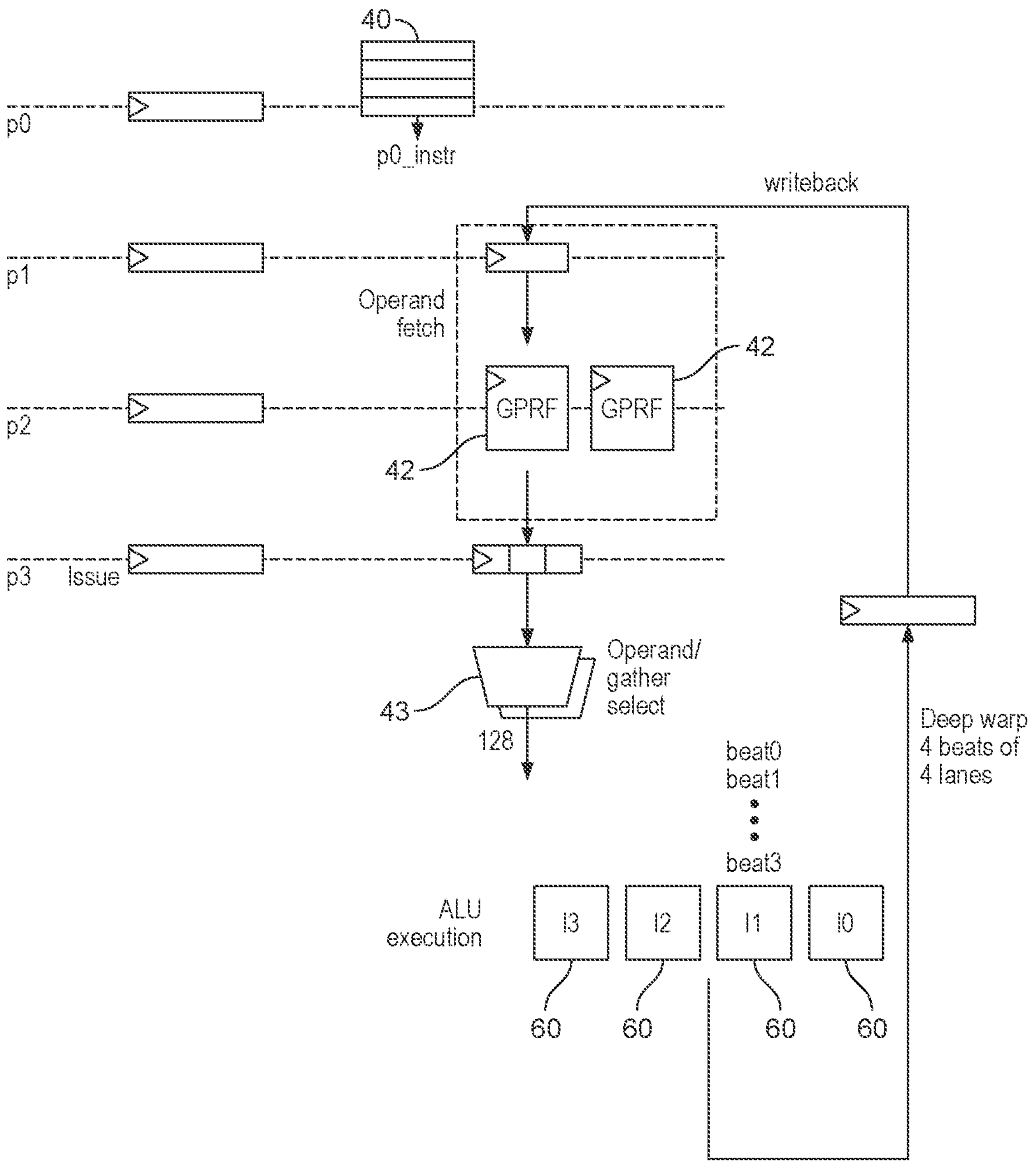
FIG. 6 shows schematically a further example data path within a graphics processor shader core, in which example the shader core is arranged as a plurality of parallel execution lanes in a 'deep warp' architecture.

On the other hand, FIG. 6 shows schematically an example of a so-called 'deep warp' architecture, in which the execution core 34 is now arranged as four parallel and identical execution lanes 60. In this example, the size of a generated thread group may therefore (and often will) be larger than the hardware size. For example, a generated thread group (warp) may contain sixteen threads, which thread group (warp) is then issued to the execution core over four processing cycles (or 'beats') (with each processing cycle processing a respective four of the execution threads).

Various other arrangements are possible in this regard and in general the execution core 34 may be arranged with any suitable and desired correspondence between the number of execution threads in a group (warp) and the number of execution lanes.

The technology described herein can generally be applied to any suitable such execution core arrangement. In particular, in the technology described herein, as discussed above, thread generation is replicated such that some work items are processed multiple times, in a redundant manner, using identical execution threads.

Thus, as shown in FIG. 3, the job controller 11 is operable to enable such operation in synchronisation with the scheduling of processing jobs/tasks for execution by the execution core 34. Therefore, when it is desired to perform the fault detection testing of the technology described herein, this can be suitably signalled to the relevant shader endpoint by the job controller 11 to cause the shader endpoint to replicate thread generation for certain work items such that those work items are then processed in the redundant manner of the technology described herein.

The signalisation from the shader endpoint to the job controller 11 of a job/task being 'done' can correspondingly be used to communicate fault detection (and potential diagnostic information) back to the (e.g.) driver.

As mentioned above, in the technology described herein, thread generation is replicated such that identical threads are generated for processing the same work item. There are various ways this can be done, as desired.

Figure 7:
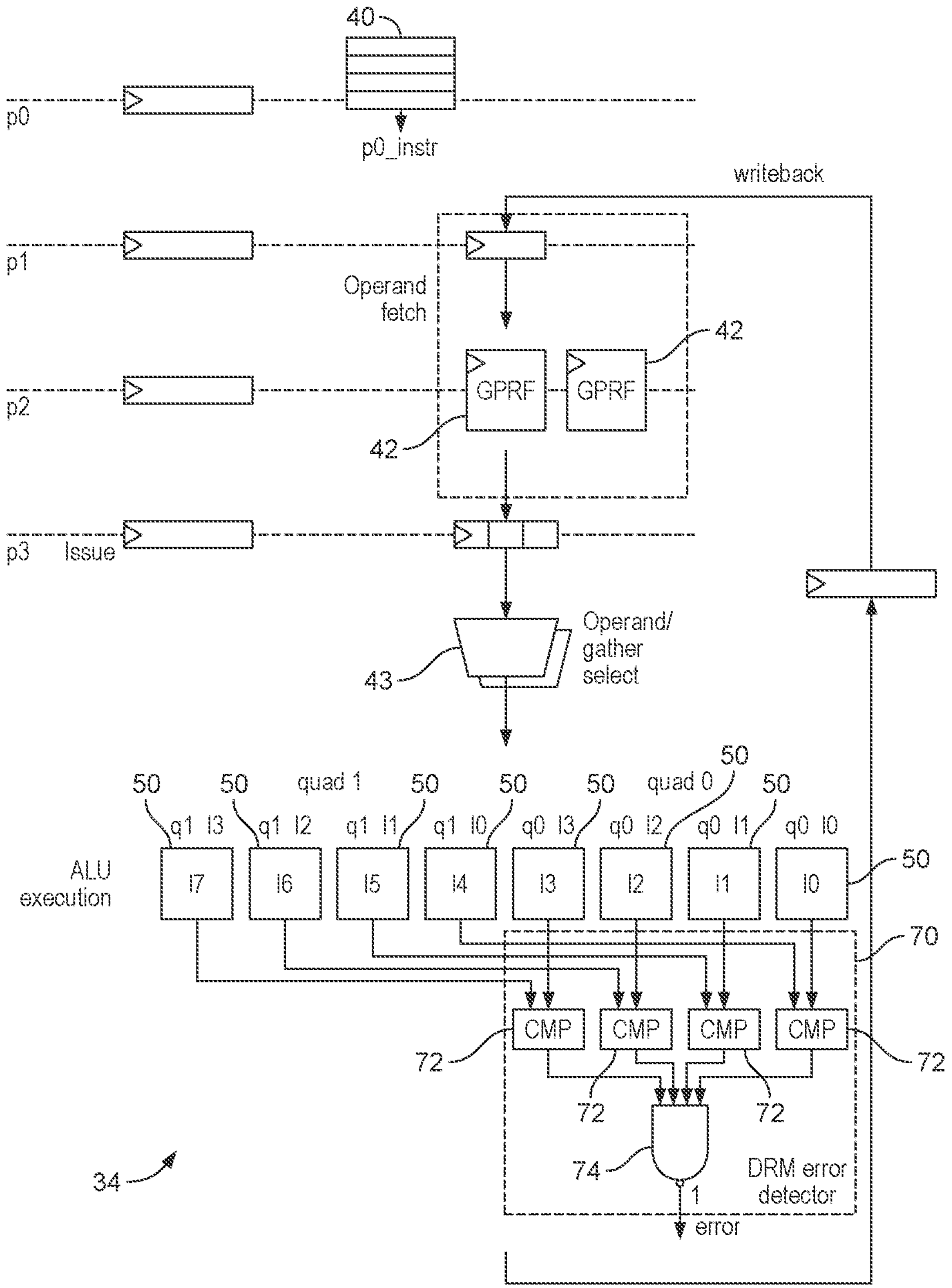
FIG. 7 shows schematically an operation of a shader core having a wide warp architecture like that shown in FIG. 5 to perform fault detection testing according an embodiment of the technology described herein.

For example, a first embodiment of a fault detection scheme according to the technology described herein is shown in FIG. 7 in which duplicate threads are generated in respect of the processing for each fragment within a set of four fragment work items (a fragment 'quad'). According to this embodiment, the job controller 11 thus causes the fragment shader endpoint 14 to generate four pairs of identical execution threads for processing the fragment 'quad' in duplicate.

In particular, in FIG. 7, the execution core 34 is arranged with a wide warp architecture, as described above in relation to FIG. 5. There are accordingly eight parallel and identical execution lanes 50. The respective sets of execution threads for processing the fragment quad in duplicate can thus be processed in a single processing cycle. Thus, as shown in FIG. 7, the threads are issued to the execution core such that the set of four fragments for the first quad (quad0) are processed in the first four execution lanes (i.e. lanes l0, l1, l2, l3) in the execution core 34 whereas the corresponding set of four fragments for the duplicated quad (quad1) are processed in the next four execution lanes (i.e. lanes l4, l5, l6, l7).

Each work item (in this case a respective fragment within a set of four fragments) is thus processed in duplicate, using a respective pair of identical execution threads that are executed in a corresponding pair of parallel execution lanes. Thus, the first lane (l0) performs the same operation as the fifth lane (l4), etc. FIG. 7 accordingly shows an example of a 'dual modular redundant' (DMR) fault detection scheme.

The processing results for each execution lane are then provided to a fault detection circuit 70 that includes a corresponding number of (i.e. four) comparator units 72 that are configured to compare the respective processing results across the pairs of identical execution threads performing processing of the same work items. Thus, a comparison is made between the processing results for the two instances of processing the same (first) fragment, i.e. by the two identical execution threads executing in execution lanes l0 and l4, and so on for the other fragments that are processed in duplicate using the other execution lanes.

The processing result for a given work item should be the same for each instance of identical processing for the work item. Thus, the comparison should, if the execution core 34 is functioning correctly, show that each identical instance of processing a work item gives the same processing result.

On the other hand, if any of the comparisons indicate that the processing result for a single work item is different for different instances of processing the work item, it is determined on this basis that there is a potential fault associated with the execution core 34, and an error is output accordingly. This error can then be suitably flagged and appropriate action taken as desired (as will be explained further below, for example in relation to FIG. 10).

Figure 8:
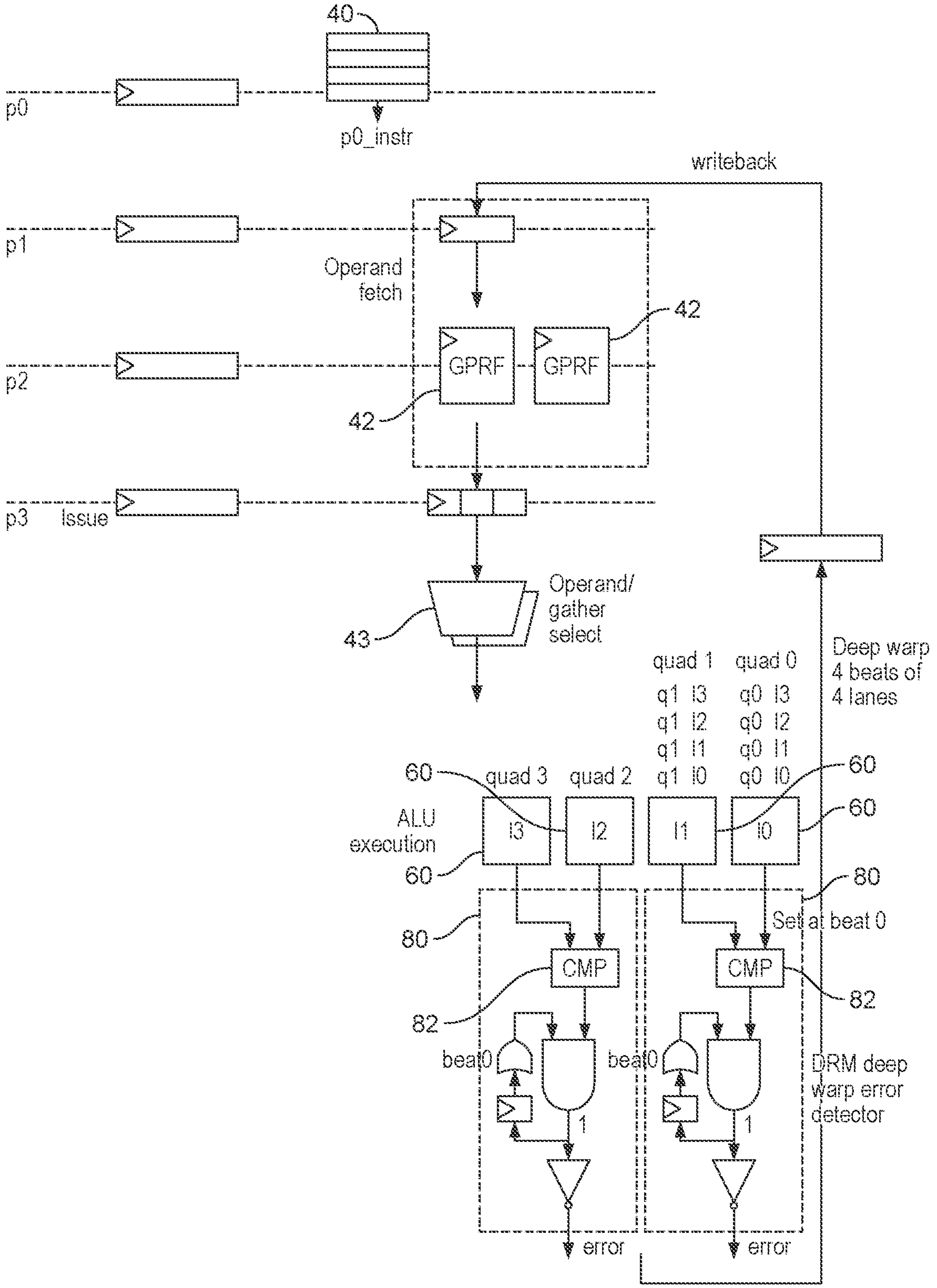
FIG. 8 shows schematically an operation of a shader core having a deep warp architecture like that shown in FIG. 6 to perform fault detection testing according an embodiment of the technology described herein.

FIG. 8 illustrates another embodiment of the technology described herein. In particular, FIG. 8 shows another example of 'dual modular redundant' (DMR) fault detection scheme but for a deep warp architecture like that shown in FIG. 6.

In this case, a quad (a set of four fragments) is processed in a single execution lane, over four processing cycles (beats). To perform the dual modular redundant (DMR) fault detection, the processing of the quad is however duplicated such that the same quad is processed by two parallel execution lanes 60. In the example shown in FIG. 8, the set of four fragments for the first quad (quad0) is thus processed in four respective beats in the first execution lane (l0), and this same processing work is duplicated and performed identically in the second execution lane (11).

The first two hardware execution lanes (10, 11) are thus executing in dual modular redundant (DMR) mode, with the processing results from the first execution lane (l0) being compared with the processing results from the second execution lane (11), in a similar manner as described above in relation to FIG. 7.

Thus, as shown in FIG. 8, the respective processing results for each instance of redundant fragment processing are provided to a suitable fault detection circuit 80 including a comparator unit 80 that compares the processing results for the different instances of processing the same fragment.

In this example, however, rather than processing all of the fragments in the quad in one processing cycle, the processing is performed over four processing cycles, with the processing result for each fragment within a pair of duplicate quads being compared, e.g. so that the comparison is made on a beat-by-beat basis, as shown in FIG. 8.

Accordingly, only if the entire set of fragments for the quad is processed without detecting an error, is the processing allowed to continue. Otherwise, if any of the fragment comparisons give different results, such that an error is determined on that basis, this is flagged as an error, for the entire quad.

In FIG. 8, as in FIG. 7, the comparison is thus performed spatially, across parallel execution lanes. In an alternate approach, however, the comparison could be performed temporally. For example, rather than executing the fragments within the same quad to one execution lane, the duplicated fragments could be issued to the same execution lane, and then processed one after another (e.g. so that the first fragment for the first quad and the corresponding first fragment for the duplicated quad are processed in adjacent processing cycles in the same execution lane.

This approach may reduce toggling, and therefore reduce energy consumption. However, as the same execution lane is used for both fragments that are being compared, this may provide lower fault tolerance (e.g. as a hard fault affecting that execution lane may affect both fragment work items in the same way).

Various other examples would be possible. For example, the identical processing could be performed on one lane in one beat and an adjacent lane on the next beat. In that case, the comparison would be made across different execution lanes and different processing cycles.

In FIG. 8, there is also shown a second parallel fault detection circuit 80 that is configured to perform duplicate fault detection between the other two execution lanes (12, 13), in the same manner described above. In FIG. 8, this is used to process a different quad.

However, this parallel fault detection circuit 80 could also be used for redundant error detection, e.g. by running the same work four times.

For instance, FIG. 7 and FIG. 8 both illustrate examples of a so-called 'dual modular redundant' (DMR) fault detection scheme in which fragment work items are processed in duplicate (only), and the respective processing results then compared to determine whether or not there is a potential fault associated with the operation of the execution core 34.

Various other arrangements would however be possible.

For example, rather than processing the same fragment work item only in duplicate, as shown in FIG. 7 and FIG. 8, the processing of a single work item may be replicated more than two times, e.g. such that the processing is performed in triplicate, i.e. a 'triple modular redundant' (TMR) fault detection scheme.

The benefit of this is that it may then be possible to correct any errors, and therefore reliably continue processing. For example, in the duplicate (DMR) fault detection schemes illustrated in FIG. 7 and FIG. 8, it is possible to detect potential errors. However, if the two work items give different processing results, there is no way to determine as such which of the processing results is correct. In that case, it may be necessary to re-issue the threads, and execute again, or even to abort the processing job, until the fault is somehow resolved.

Figure 9:
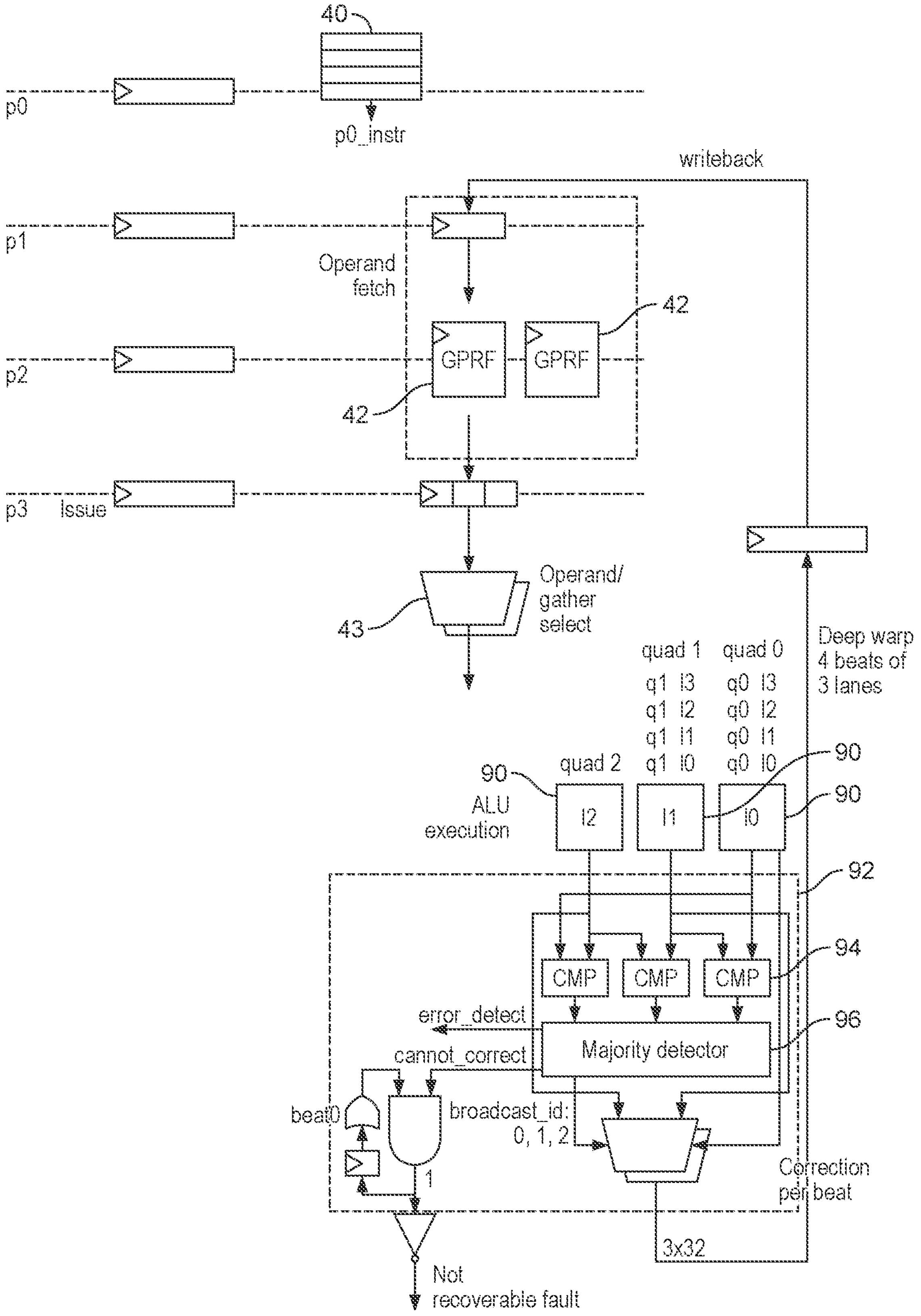
FIG. 9 shows schematically an operation of a shader core having a deep warp architecture like that shown in FIG. 6 to perform fault detection testing according another embodiment of the technology described herein.

FIG. 9 thus shows an example of a 'triple modular redundant' (TMR) fault detection scheme where the processing for the same work item is performed in triplicate across three parallel execution lanes 90. In this case, in the event that an error is determined, it may also be possible to correct the error, and continue processing, as will be explained further below.

In FIG. 9, as in FIG. 8, the execution core 34 has a deep warp architecture, such that a respective quad (set of four fragments) is processed in a corresponding four processing cycles (beats). Thus, the comparison is in an embodiment made on a beat by beat basis, for each fragment within the quad (set of fragments), as described above. Other arrangements would however be possible.

The fault detection circuit 92 in FIG. 9 is thus configured to compare 94 the processing results on a fragment by fragment basis between each of the three parallel execution lanes 90 that are processing the same fragment work item, in a similar manner as described above. In this case, however, the processing results are then provided to a suitable majority detector circuit 96 that is operable to select the majority processing result and use this result to continue processing. Thus, at least in some cases, e.g. where there is a clear majority processing result, it is possible for the majority detector circuit 96 to then select the majority processing result accordingly, and use this for continued processing. Thus, the majority processing result may be (and is) written back to the general purpose register files 42, etc., for output.

On the other hand, if the correct result still cannot be disambiguated, this may be flagged appropriately, e.g. as a non-recoverable fault.

Various other arrangements would be possible.

Thus, by processing at least some work items redundantly, e.g. in duplicate, or triplicate, and then comparing the processing results, it is possible to dynamically detect faults associated with the operation of the execution core 34.

The fault detection schemes according to the above embodiments may be incorporated alongside processing work in various suitable manners, as will be described with reference to the examples below.

Figure 10:
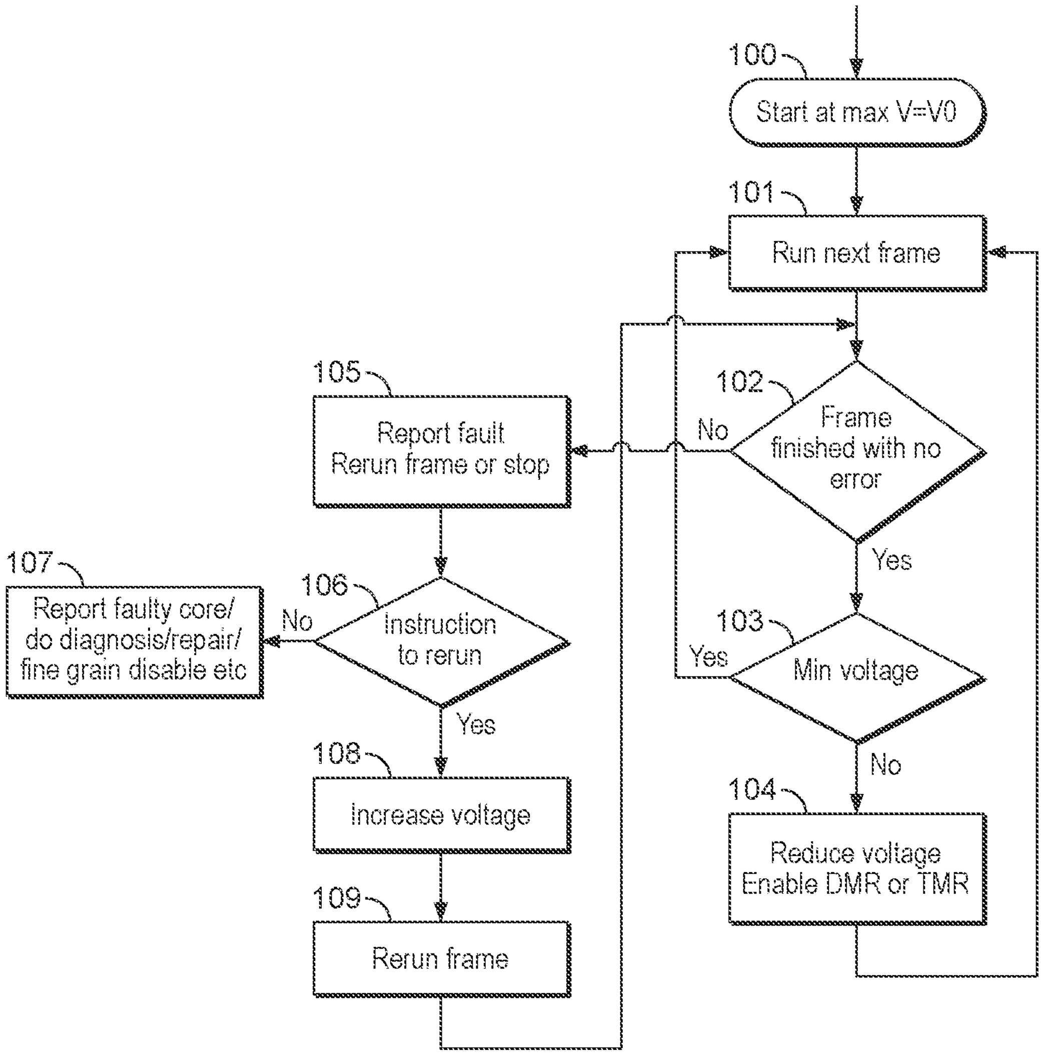
FIG. 10 is a flowchart illustrating an operation of a graphics processor an embodiment of the technology described herein.

FIG. 10 illustrates a first operation according to one embodiment of the technology described herein. In particular, FIG. 10 illustrates how the fault detection schemes described above can be used to provide improved power management, in particular by adaptively controlling the operating voltage to ensure continued reliable operation.

In the scheme illustrated in FIG. 10, the graphics processor is initially operated at its maximum voltage (step 100). The processing for the next (i.e. the first) frame is then performed, in the normal manner (step 101).

Assuming the processing for the first frame completes without error (step 102—yes), the operating voltage is then reduced (since during the first pass the operating voltage is not yet at the minimum functional voltage (i.e. a functional voltage where a specified maximum acceptable error rate is achieved), i.e. step 103=no) and a fault detection scheme according to any of the embodiments described above is then enabled (step 104).

The next frame is then processed (step 101). Again, if this frame is processed without error (step 102—yes), the operating voltage is further reduced (step 104), and so on, until the minimum voltage is reached (step 103—yes). However, as the operating voltage is reduced, the execution unit may become more susceptible to faults.

Thus, if at some point an error is detected when processing a frame (step 102—no), this fault can then be flagged accordingly (step 105). At that point, the processing for the frame may either be repeated, or stopped, as necessary. Thus, if there an instruction to re-run the frame (step 106—yes), the operating voltage may be increased (step 108), and the processing repeated (step 109). If there is no instruction to re-run the frame (e.g. because the frame has already been re-run without success) (step 106—no), the core may be reported as faulty (step 107). The driver may then take the core offline (or take an execution lane offline if the fault can be localised) to perform fault diagnosis/repair, etc.

For example, in FIG. 10, the graphics processor may have a number of shader cores (and a number of execution engines), e.g. as shown in FIG. 3. Thus, if a fault is detected in a particular core, that core may be taken offline, and processing work continued using the remaining shader cores. However, it will be appreciated that the performance of each shader core/execution engine (or a group of shader cores) could be individually optimised.

For instance, in FIG. 10, the fault detection scheme is used for optimising the operating voltage of the graphics processor. Although FIG. 10 describes adjusting the operating voltage, it will be appreciated that other operating parameters may be adjusted in a similar way. For example, the operating frequency could also be adjusted in a similar manner. In embodiments, both the operating voltage and operating frequency may be adjusted to optimise the device operation. In that case, the operation may be tuned by reducing the operating voltage and/or increasing the operating frequency as much as possible whilst still ensuring an error-free execution. For example, there may typically be more fine grained control of the operating frequency. So, the operating voltage could be first reduced to a functional minimum, and then the operating frequency optimised at that voltage. Various other arrangements would of course be possible.

Note that FIG. 10 shows an example of executing frames. However, the error checking could be performed on a more fine-grained basis, for example, per tile, per draw call, per compute work item, per neural network layer, etc. This would then reduce the amount of work to be re-executed if an error were found.

In the example shown in FIG. 10, once the fault detection is enabled, the fault detection is then used continually, throughout the processing of the frames. This therefore increases utilisation of the execution core 34 and of course also means the processing of a frame will take longer (than it would if the DMR/TMR fault detection scheme had not been enabled).

In some embodiments, the fault detection is therefore only enabled for a relatively shorter period, to provide periodic confirmation that the execution core 34 is (hopefully) functionally correctly. An example of this is shown in FIG. 11.

Figure 11:
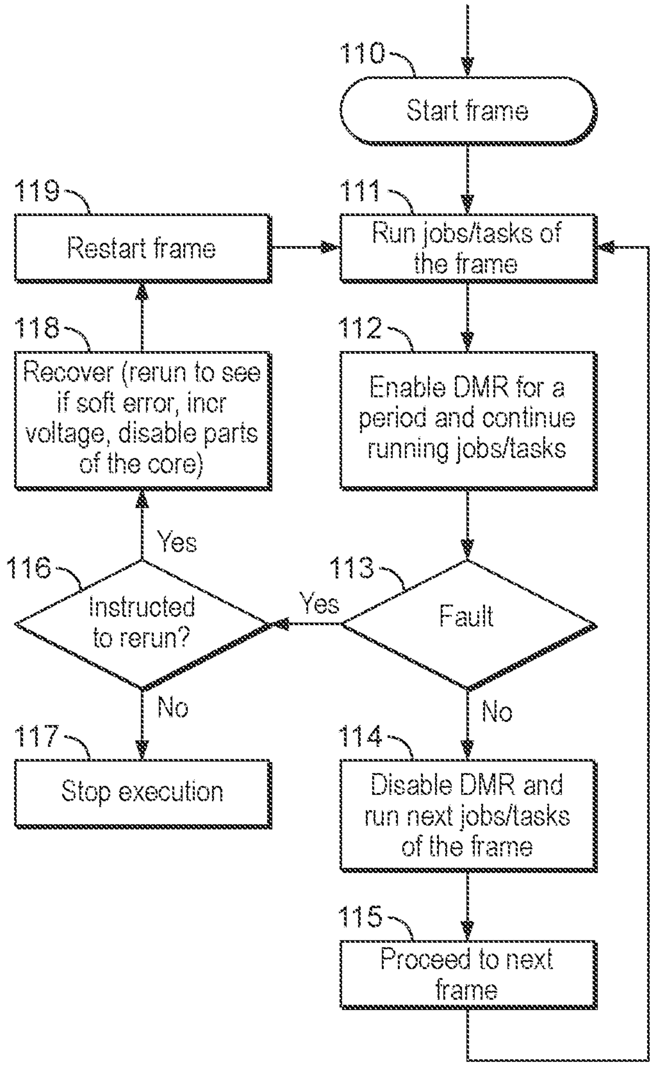
FIG. 11 is a flowchart illustrating another operation of a graphics processor another embodiment of the technology described herein.

In FIG. 11, the processing for a frame is started (step 110), and the required processing jobs/tasks for the frame are thus scheduled and performed accordingly (step 111), e.g. as normal. However, at some point during the processing of the frame, a fault detection scheme according to the technology described herein (e.g. a duplicate, DMR scheme) is enabled (step 112).

The processing jobs/tasks for the frame thus continue to run, but with the work items being processed in duplicate, at least for a portion of the frame. If no fault is detected (step 113—no), then at some point the fault detection is disabled (step 114) and the processing for the frame is finished. The processing then proceeds to the next frame (step 115).

On the other hand, if during the processing of a given frame a fault is detected (step 113—yes), it is then checked whether the frame should be re-run (step 116). If the frame should not be re-run (step 116—no), the execution is stopped (step 117). Otherwise, if the frame should be re-run (step 116—yes), an attempt is made to recover the processing, e.g. by re-running the frame (to see if the fault has self-corrected) either in the same part of the core (in an embodiment with an adjusted operating parameter) or in a different core, or different part of the core, as desired (step 118). At this point the operation conditions of the device may also be adjusted to try to minimise the likelihood of an error, for example by increasing operating voltage and/or reducing operating frequency. The frame can then be re-started appropriately (step 119).

In both FIG. 10 and FIG. 11 the work items that are processed in duplicate, or triplicate, to perform the fault detection testing are actual (e.g. fragment) work items that are required to be processed for the current processing job (e.g. the current frame). This provides the benefit that fault detection (testing) is performed more dynamically, without interrupting the processing job. For example, if no fault is detected, the processing can run as normal.

However, the technology described herein can also be applied to perform dedicated testing, e.g. at the end of the processing of a frame, to check that the execution unit is functioning correctly at that point. This still has the benefits of a relatively simpler and efficient testing at the execution thread level but the work items are now specific test work items ('vectors') designed to check the operation of certain functional elements associated with the execution unit, rather than actual work items being processed as part of the processing job.

Figure 12:
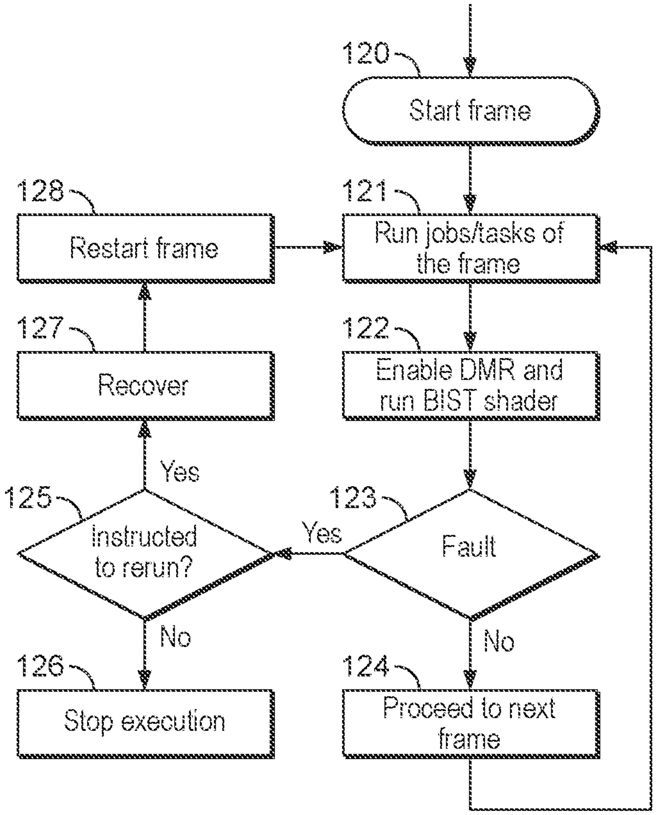
FIG. 12 is a flowchart illustrating yet another operation of a graphics processor a further embodiment of the technology described herein.

An example of this approach is shown in FIG. 12. In FIG. 12, the processing for a frame is started (step 120), and the require processing jobs/tasks for the frame are thus scheduled and performed accordingly (step 121), e.g. as normal.

After the processing for the frame has finished, a fault detection scheme according to the technology described herein (e.g. a duplicate, DMR scheme) is enabled, and one or more suitable test vector work items for a BIST shader are issued to the execution core for execution (step 122). If the fault detection determines that there is no fault (step 123—no), the processing then continues to the next frame (step 124), which is then processed in the same way.

On the other hand, if a fault is detected after the processing of a given frame (step 123—yes), it is determined whether the frame should be re-run (step 125). If so (step 125—yes), appropriate fault recovery is performed (step 127) and the processing of the frame is re-started (step 128). As discussed above, prior to restarting the frame, the device operating conditions may be adjusted to try to minimise the likelihood of an error, for example increasing voltage and/or reducing operating frequency. Otherwise, if the frame should not be re-run (step 125—no), the execution is stopped (step 126).

Various other examples would be possible. These operations can also be combined depending on the processing work that is to be performed.

For example, some processing tasks/applications may not require any fault detection to be performed, and so the techniques discussed above need not be used (i.e. the fault detection of the technology described herein can be performed selectively, as and when required).

On the other hand, for some processing tasks/applications where higher levels of functional safety is desired, it may be appropriate for the fault detection to be performed continually, throughout the processing job. This provides higher levels of reliability but naturally increases power utilisation and the processing time to complete the processing job. Another option therefore is to enable DMR/TMR periodically, e.g. as described in relation to FIG. 11.

Indeed, a benefit of the technology described herein is that the fault detection can be flexibly and dynamically scheduled alongside other processing work, as desired.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor to perform data processing for an application executing on a host processor, in response to commands received from the host processor, wherein the graphics processor comprises a programmable execution unit operable to execute programs to perform processing operations, and in which when executing a program, the execution unit executes the program for respective execution threads, each execution thread corresponding to a respective work item, the execution unit having an associated thread generating circuit that is configured to generate execution threads for execution by the execution unit, and wherein the graphics processor further comprises a controller that is operable, when the graphics processor is performing a processing job, to issue processing tasks for that processing job to the execution unit, wherein the thread generating circuit associated with the execution unit will then generate appropriate execution threads for execution by the execution unit, the method comprising:

whilst the graphics processor is performing the processing job:

the controller signaling to the execution unit when fault detection testing is to be performed to thereby cause the thread generating circuit associated with the execution unit to generate for execution by the execution unit a set of two or more identical execution threads, wherein each of the execution threads in the set of two or more identical execution threads is configured to perform identical processing for the same work item when executed, the thread generating circuit thus being selectively operable during the processing job to generate the set of two or more identical execution threads when fault detection testing is to be performed; and the method further comprising:

executing by the execution unit the respective execution threads in the set of two or more identical execution threads such that the same work item is processed by each of the execution threads in the set of two or more identical execution threads;

comparing a result of the processing of the same work item for the respective execution threads in the set of two or more identical execution threads that have processed the work item; and using the comparison of the result of the processing of the same work item for the respective execution threads in the set of two or more identical execution threads that have processed the same work item to determine whether there is a fault associated with the graphics processor.

2. The method of claim 1, wherein when the comparison shows that the result of the processing of the work item that has been processed by the execution threads in the set of two or more identical execution threads is different for different ones of the execution threads in the set of two or more identical execution threads, the method comprises determining on that basis that there is a fault associated with the programmable execution unit.

3. The method of claim 1, wherein when executing a program, the programmable execution unit executes the program for groups of plural execution threads, and wherein the set of two or more identical execution threads are generated as part of the same group of execution threads.

4. The method of claim 3, wherein the programmable execution unit comprises a plurality of processing lanes arranged in parallel, such that plural execution threads can be processed in different processing lanes of the execution unit in a single processing cycle, and wherein the method comprises executing the identical threads in the set of identical threads in different processing lanes of execution unit in the same processing cycle, such that the comparison includes a comparison of the processing result for identical execution threads executing in parallel execution lanes in the same processing cycle.

5. The method of claim 3, wherein respective threads in the set of identical threads that perform processing of the same work item are executed by the execution unit in different processing cycles, such that the comparison includes a comparison of the processing result for identical execution threads performing processing of the same work item at different times.

6. The method of claim 1, wherein in response to determining using the comparison that there is a fault associated with the programmable execution unit, the method comprises:

(i) re-issuing the set of identical threads for processing the work item for execution by the programmable execution unit, and executing the threads again to perform the processing of the work item in question; and/or (ii) adjusting an operating parameter of the graphics processor.

7. The method of claim 1, wherein the step of generating sets of identical threads for processing the same work item is performed periodically or intermittently during the operation of the graphics processor.

8. The method of claim 1, comprising monitoring an operating environment of the graphics processor including monitoring at least one of an operating temperature and an operating voltage of the graphics processor, and, in response to detecting a change in the operating environment, triggering fault detecting testing by generating for execution by the execution unit a set of two or more identical execution threads, wherein each of the execution threads in the set of two or more identical execution threads is configured to perform processing for the same work item when executed.

9. The method of claim 1, wherein the set of identical threads comprises three or more identical execution threads for processing the same work item, and wherein in response to different instances of processing the same work item for respective threads in the set of identical threads giving different processing results, a majority processing result from the set of identical threads processing the work item in question is used for continuing processing.

10. The method of claim 1, wherein the graphics processor is executing a program to perform an overall data processing job, and wherein the work items correspond to work items that need to be processed for the data processing job, wherein the step of generating for execution by the execution unit a set of two or more identical execution threads for processing the same work item comprises replicating the thread generation for a work item that needs to be processed for the overall data processing job.

11. The method of claim 1, wherein the work items that are processed using the set of identical threads to determine whether there is a fault associated with the programmable execution unit are dedicated work items that are designed to test one or more functional units associated with the programmable execution unit for faults.

12. A graphics processor operable, in response to commands received from a host processor, to perform data processing for applications executing on the host processor, the graphics processor comprising:

a programmable execution unit operable to execute programs to perform processing operations, and in which when executing a program, the execution unit executes the program for respective execution threads, each execution thread corresponding to a respective work item;

a thread generating circuit associated with the execution unit; and a controller that is operable to issue processing tasks to the execution unit to cause the thread generating circuit associated with the execution unit to generate execution threads for execution by the execution unit, wherein the controller is further operable, whilst the graphics processor is performing a processing job, to signal to the execution unit when fault detection testing is to be performed to thereby cause the thread generating circuit associated with the execution unit to generate a set of two or more identical execution threads, each of the execution threads in the set of two or more identical execution threads being configured to perform identical processing for the same work item when executed, the thread generating circuit thus being selectively operable during a processing job to generate the set of two or more identical execution threads when fault detection testing is to be performed; and a fault detection circuit that is configured to compare a result of the processing of a work item for respective execution threads in a set of two or more identical execution threads that have processed the same work item, and to use the comparison of the result of the processing of the same work item for the respective execution threads in the set of two or more identical execution threads that have processed the same work item to determine whether there is a fault associated with the graphics processor.

13. The graphics processor of claim 12, wherein when the comparison shows that the result of the processing of the work item that has been processed by the execution threads in the set of two or more identical execution threads is different for different ones of the execution threads in the set of two or more identical execution threads, the fault detection circuit is configured to determine on that basis that there is a fault associated with the programmable execution unit.

14. The graphics processor of claim 12, wherein when executing a program, the programmable execution unit executes the program for groups of plural execution threads, and wherein the set of two or more identical execution threads are generated by the thread generating circuit as part of the same group of execution threads, and wherein the programmable execution unit comprises a plurality of processing lanes arranged in parallel, such that plural execution threads can be processed in different processing lanes of the execution unit in a single processing cycle, and wherein the graphics processor is configured to execute the threads in the set of identical threads in different processing lanes of execution unit in the same processing cycle, such that the comparison includes a comparison of the processing result for identical execution threads executing in parallel execution lanes in the same processing cycle.

15. The graphics processor of claim 12, wherein when executing a program, the programmable execution unit executes the program for groups of plural execution threads, and wherein the set of two or more identical execution threads are generated by the thread generating circuit as part of the same group of execution threads, and wherein the graphics processor is configured to cause respective threads in the set of identical threads that perform processing of the same work item to be executed by the execution unit in different processing cycles, such that the comparison includes a comparison of the processing result for identical execution threads performing processing of the same work item at different times.

16. The graphics processor of claim 12, wherein in response to determining using the comparison that there is a fault associated with the programmable execution unit, the graphics processor is configured to:

cause a power control circuit of the graphics processor to adjust an operating parameter of the data processor, wherein the operating parameter is at least one of an operating voltage and an operating frequency of the graphics processor.

17. The data processor of claim 12, wherein the thread generating circuit is caused to periodically or intermittently generate sets of identical threads for processing the same work item during the operation of the graphics processor.

18. The graphics processor of claim 12, further comprising a monitoring circuit configured to monitor an operating environment of the graphics processor and, in response to the monitoring circuit detecting a change in the operating environment, fault detecting testing is triggered by causing the thread generating circuit to generate for execution by the execution unit a set of two or more identical execution threads, wherein each of the execution threads in the set of two or more identical execution threads is configured to perform processing for the same work item when executed.

19. The graphics processor of claim 12, wherein the set of identical threads comprises three or more identical execution threads for processing the same work item, and wherein in response to different instances of processing the same work item using respective threads in the set of identical threads giving different processing results, the fault detection circuit is configured to select a majority processing result from the set of identical threads processing the work item for use for continuing processing.

20. The graphics processor of claim 12, wherein when the graphics processor is executing a program to perform an overall data processing job, the thread generating circuit is configured to replicate the thread generation for work items that need to be processed for the overall data processing job.

* * * * *